(12) United States Patent
Pittman, Jr.

(10) Patent No.: US 12,012,082 B1
(45) Date of Patent: Jun. 18, 2024

(54) SYSTEMS AND METHODS FOR A HYDRAULIC VENT INTERLOCK

(71) Applicant: MARATHON PETROLEUM COMPANY LP, Findlay, OH (US)

(72) Inventor: David E. Pittman, Jr., Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 0 days.

(21) Appl. No.: 18/378,760

(22) Filed: Oct. 11, 2023

Related U.S. Application Data

(60) Provisional application No. 63/478,052, filed on Dec. 30, 2022.

(51) Int. Cl.
    B60T 13/26 (2006.01)
    B60T 17/18 (2006.01)
    B60T 13/00 (2006.01)

(52) U.S. Cl.
    CPC ............. *B60T 17/18* (2013.01); *B60T 13/26* (2013.01)

(58) Field of Classification Search
    CPC ...................................................... B60T 13/26
    See application file for complete search history.

(56) References Cited

U.S. PATENT DOCUMENTS

| | | |
|---|---|---|
| 2,626,627 A | 1/1953 | Jung et al. |
| 2,864,252 A | 12/1958 | Schaschl |
| 3,087,311 A | 4/1963 | Rousseau |
| 3,303,525 A | 2/1967 | Peoples |
| 3,398,071 A | 8/1968 | Bagno |
| 3,504,686 A | 4/1970 | Cooper et al. |
| 3,593,555 A | 7/1971 | Grosko |
| 3,608,869 A | 9/1971 | Woodle |

(Continued)

FOREIGN PATENT DOCUMENTS

| | | |
|---|---|---|
| AU | 2010241217 | 11/2010 |
| AU | 2013202839 | 5/2014 |

(Continued)

OTHER PUBLICATIONS

Lloyd's Register, Using technology to trace the carbon intensity of sustainable marine fuels, Feb. 15, 2023.

(Continued)

*Primary Examiner* — Melody M Burch
(74) *Attorney, Agent, or Firm* — Womble Bond Dickinson (US) LLP

(57) ABSTRACT

Systems and methods for a vent interlock system to ensure vent cover closure prior to operation of a transportation vehicle. An embodiment of a system may include an interlock bar. The interlock bar may, in a lowered position, prevent a hydraulic valve handle of a hydraulic pump assembly from moving from an open position to a closed position, the hydraulic valve handle in the closed position to allow a vent cover of the trailer to be opened. The system may include a plunger valve connected to brakes of the transportation vehicle to lock the brakes of the transportation vehicle to prevent operation of the transportation vehicle when the interlock bar is raised. The system may include a spring operated latch attached to the transportation vehicle to hold the interlock bar in the lowered position via a notch or aperture in the interlock bar.

30 Claims, 11 Drawing Sheets

(56) References Cited

U.S. PATENT DOCUMENTS

| | | | |
|---|---|---|---|
| 3,672,180 A | 6/1972 | Davis | |
| 3,725,669 A | 4/1973 | Tatum | |
| 3,807,433 A | 4/1974 | Byrd | |
| 3,809,113 A | 5/1974 | Grove | |
| 3,925,592 A | 12/1975 | Webb | |
| 3,961,493 A | 6/1976 | Nolan, Jr. | |
| 4,010,779 A | 3/1977 | Pollock et al. | |
| 4,073,303 A | 2/1978 | Foley, Jr. | |
| 4,109,677 A * | 8/1978 | Burnside | B67D 7/3227 |
| | | | 137/586 |
| 4,202,351 A | 5/1980 | Biche | |
| 4,229,064 A | 10/1980 | Vetter et al. | |
| 4,242,533 A | 12/1980 | Cott | |
| 4,289,163 A | 9/1981 | Pierson | |
| 4,294,378 A | 10/1981 | Rabinovich | |
| 4,320,775 A | 3/1982 | Stirling et al. | |
| 4,357,576 A | 11/1982 | Hickam et al. | |
| 4,420,008 A | 12/1983 | Shu | |
| 4,457,037 A | 7/1984 | Rylander | |
| 4,481,474 A | 11/1984 | Gerrit | |
| 4,488,570 A | 12/1984 | Jiskoot | |
| 4,630,685 A | 12/1986 | Huck et al. | |
| 4,690,587 A | 9/1987 | Petter | |
| 4,744,305 A | 5/1988 | Lim et al. | |
| 4,788,093 A | 11/1988 | Murata et al. | |
| 4,794,331 A | 12/1988 | Schweitzer, Jr. | |
| 4,848,082 A | 7/1989 | Takahashi | |
| 4,897,226 A | 1/1990 | Hoyle et al. | |
| 4,904,932 A | 2/1990 | Schweitzer, Jr. | |
| 4,964,732 A | 10/1990 | Cadeo et al. | |
| 5,050,064 A | 9/1991 | Mayhew | |
| 5,095,977 A | 3/1992 | Ford | |
| 5,129,432 A | 7/1992 | Dugger | |
| 5,191,537 A | 3/1993 | Edge | |
| 5,367,882 A | 11/1994 | Lievens et al. | |
| 5,383,243 A | 1/1995 | Thacker | |
| 5,469,830 A | 11/1995 | Gonzalez | |
| 5,533,912 A | 7/1996 | Fillinger | |
| 5,562,133 A | 10/1996 | Mitchell | |
| 5,595,709 A | 1/1997 | Klemp | |
| 5,603,360 A | 2/1997 | Teel | |
| 5,627,749 A | 5/1997 | Waterman et al. | |
| 5,661,623 A | 8/1997 | McDonald | |
| 5,783,916 A | 7/1998 | Blackburn | |
| 5,814,982 A | 9/1998 | Thompson et al. | |
| 5,832,967 A | 11/1998 | Andersson | |
| 5,873,916 A | 2/1999 | Cemenska et al. | |
| 5,895,347 A | 4/1999 | Doyle | |
| 5,906,648 A | 5/1999 | Zoratti et al. | |
| 5,906,877 A | 5/1999 | Popper et al. | |
| 5,939,166 A | 8/1999 | Cheng et al. | |
| 5,962,774 A | 10/1999 | Mowry | |
| 5,973,593 A | 10/1999 | Botella | |
| 5,993,054 A | 11/1999 | Tan et al. | |
| 6,022,421 A | 2/2000 | Bath | |
| 6,050,844 A | 4/2000 | Johnson | |
| 6,065,903 A | 5/2000 | Doyle | |
| 6,077,340 A | 6/2000 | Doyle | |
| 6,077,418 A | 6/2000 | Iseri et al. | |
| 6,098,601 A | 8/2000 | Reddy | |
| 6,111,021 A | 8/2000 | Nakahama et al. | |
| 6,149,351 A | 11/2000 | Doyle | |
| 6,186,193 B1 | 2/2001 | Phallen et al. | |
| 6,243,483 B1 | 6/2001 | Petrou et al. | |
| 6,333,374 B1 | 12/2001 | Chen | |
| 6,346,813 B1 | 2/2002 | Kleinberg | |
| 6,383,237 B1 | 5/2002 | Langer et al. | |
| 6,427,384 B1 * | 8/2002 | Davis, Jr. | B65D 90/10 |
| | | | 49/258 |
| 6,478,353 B1 | 11/2002 | Barrozo | |
| 6,679,302 B1 | 1/2004 | Mattingly et al. | |
| 6,719,921 B2 | 4/2004 | Steinberger et al. | |
| 6,799,883 B1 | 10/2004 | Urquhart et al. | |
| 6,834,531 B2 | 12/2004 | Rust | |
| 6,840,292 B2 | 1/2005 | Hart et al. | |
| 6,851,916 B2 | 2/2005 | Schmidt | |
| 6,980,647 B1 | 12/2005 | Daugherty et al. | |
| 6,987,877 B2 | 1/2006 | Paz-Pujalt et al. | |
| 7,032,629 B1 | 4/2006 | Mattingly et al. | |
| 7,091,421 B2 | 8/2006 | Kukita et al. | |
| 7,186,321 B2 | 3/2007 | Benham | |
| 7,258,710 B2 | 8/2007 | Caro et al. | |
| 7,275,366 B2 | 10/2007 | Powell et al. | |
| 7,294,913 B2 | 11/2007 | Fischer et al. | |
| 7,385,681 B2 | 6/2008 | Ninomiya et al. | |
| 7,444,996 B2 | 11/2008 | Potier | |
| 7,459,067 B2 | 12/2008 | Dunn et al. | |
| 7,564,540 B2 | 7/2009 | Paulson | |
| 7,631,671 B2 | 12/2009 | Mattingly et al. | |
| 7,729,561 B1 | 6/2010 | Boland et al. | |
| 7,749,308 B2 | 7/2010 | McCully | |
| 7,810,988 B2 | 10/2010 | Kamimura et al. | |
| 7,815,744 B2 | 10/2010 | Abney et al. | |
| 7,832,338 B2 | 11/2010 | Caro et al. | |
| 7,879,204 B2 | 2/2011 | Funahashi | |
| 8,075,651 B2 | 12/2011 | Caro et al. | |
| 8,282,265 B2 | 10/2012 | Breithhaupt | |
| 8,299,811 B2 | 10/2012 | Wing | |
| 8,312,584 B2 | 11/2012 | Hodde | |
| 8,327,631 B2 | 12/2012 | Caro et al. | |
| 8,368,405 B2 | 2/2013 | Siebens | |
| 8,376,432 B1 | 2/2013 | Halger et al. | |
| 8,402,746 B2 | 3/2013 | Powell et al. | |
| 8,413,484 B2 | 4/2013 | Lubkowitz | |
| 8,414,781 B2 | 4/2013 | Berard | |
| 8,577,518 B2 | 11/2013 | Linden et al. | |
| 8,597,380 B2 | 12/2013 | Buchanan | |
| 8,632,359 B2 | 1/2014 | Grimm | |
| 8,647,162 B2 | 2/2014 | Henriksson et al. | |
| 8,748,677 B2 | 6/2014 | Buchanan | |
| 8,808,415 B2 | 8/2014 | Caro et al. | |
| 8,979,982 B2 | 3/2015 | Jordan et al. | |
| 9,038,855 B2 | 5/2015 | Lurcott et al. | |
| 9,162,944 B2 | 10/2015 | Bennett et al. | |
| 9,175,235 B2 | 11/2015 | Kastner | |
| 9,222,480 B2 | 12/2015 | Younes et al. | |
| 9,310,016 B2 | 4/2016 | Hodde | |
| 9,329,066 B2 | 5/2016 | Skarping | |
| 9,363,462 B2 | 6/2016 | Yoel | |
| 9,388,350 B2 | 7/2016 | Buchanan | |
| 9,518,693 B2 | 12/2016 | Hodde | |
| 9,550,247 B2 | 1/2017 | Smith | |
| 9,643,135 B1 | 5/2017 | Mazzei et al. | |
| 9,945,333 B2 | 4/2018 | Kopinsky | |
| 10,001,240 B1 | 6/2018 | Dray et al. | |
| 10,012,340 B1 | 7/2018 | Dray et al. | |
| 10,024,768 B1 | 7/2018 | Johnsen | |
| 10,094,508 B1 | 10/2018 | Dray et al. | |
| 10,168,255 B1 | 1/2019 | Johnsen | |
| 10,196,243 B1 | 2/2019 | Wells | |
| 10,197,206 B1 | 2/2019 | Dray et al. | |
| 10,247,643 B1 | 4/2019 | Johnsen | |
| 10,287,940 B2 | 5/2019 | Tonsich | |
| 10,345,221 B1 | 7/2019 | Silverman | |
| 10,364,718 B2 | 7/2019 | Eddaoudi et al. | |
| 10,386,260 B2 | 8/2019 | Dudek | |
| 10,408,377 B1 | 9/2019 | Dray et al. | |
| 10,486,946 B1 | 11/2019 | Wells | |
| 10,501,385 B1 | 12/2019 | Buckner et al. | |
| 10,563,555 B2 | 2/2020 | Hamad | |
| 10,570,581 B2 | 2/2020 | Faivre | |
| 10,605,144 B2 | 3/2020 | Kobayashi | |
| 10,633,830 B2 | 4/2020 | Shibamori | |
| 10,655,774 B1 | 5/2020 | Dray et al. | |
| 10,657,443 B2 | 5/2020 | Araujo et al. | |
| 10,688,686 B2 | 6/2020 | Fadhel et al. | |
| 10,756,459 B2 | 8/2020 | Jongsma | |
| 10,833,434 B1 | 11/2020 | Tassell, Jr. | |
| 10,943,357 B2 | 3/2021 | Badawy et al. | |
| 10,948,471 B1 | 3/2021 | MacMullin et al. | |
| 10,953,960 B1 | 3/2021 | Sharp | |
| 10,962,437 B1 | 3/2021 | Nottrott et al. | |
| 10,970,927 B2 | 4/2021 | Sharp | |
| 10,990,114 B1 | 4/2021 | Miller | |

(56) References Cited

U.S. PATENT DOCUMENTS

| | | |
|---|---|---|
| 10,997,707 B1 | 5/2021 | Katz et al. |
| 11,010,608 B2 | 5/2021 | Adam et al. |
| 11,112,308 B2 | 9/2021 | Kreitinger et al. |
| 11,125,391 B2 | 9/2021 | Al Khowaiter et al. |
| 11,132,008 B2 | 9/2021 | Miller |
| 11,164,406 B2 | 11/2021 | Meroux et al. |
| 11,221,107 B2 | 1/2022 | Du et al. |
| 11,247,184 B2 | 2/2022 | Miller |
| 11,325,687 B1 | 5/2022 | Sharp |
| 11,332,070 B2 | 5/2022 | Holden et al. |
| 11,345,455 B2 | 5/2022 | Sharp |
| 11,416,012 B2 | 8/2022 | Miller |
| 11,428,600 B2 | 8/2022 | Dankers et al. |
| 11,447,877 B1 | 9/2022 | Ell |
| 11,559,774 B2 | 1/2023 | Miller |
| 11,565,221 B2 | 1/2023 | Miller |
| 11,578,638 B2 | 2/2023 | Thobe |
| 11,578,836 B2 | 2/2023 | Thobe |
| 11,596,910 B2 | 3/2023 | Miller |
| 11,607,654 B2 | 3/2023 | Miller |
| 11,655,748 B1 | 5/2023 | Thobe |
| 11,655,940 B2 | 5/2023 | Thobe |
| 11,662,750 B2 | 5/2023 | Miller |
| 11,686,070 B1 | 6/2023 | Jordan et al. |
| 11,715,950 B2 | 8/2023 | Miller et al. |
| 11,720,526 B2 | 8/2023 | Miller et al. |
| 11,739,679 B2 | 8/2023 | Thobe |
| 11,752,472 B2 | 9/2023 | Miller |
| 11,754,225 B2 | 9/2023 | Thobe |
| 11,774,042 B2 | 10/2023 | Thobe |
| 11,794,153 B2 | 10/2023 | Miller |
| 11,807,945 B2 | 11/2023 | Ell |
| 11,808,013 B1 | 11/2023 | Jordan et al. |
| 11,815,227 B2 | 11/2023 | Thobe |
| 11,920,504 B2 | 3/2024 | Thobe |
| 11,965,317 B2 | 4/2024 | Jordan |
| 2002/0014068 A1 | 2/2002 | Mittricker et al. |
| 2002/0178806 A1 | 12/2002 | Valentine |
| 2003/0041518 A1 | 3/2003 | Wallace et al. |
| 2003/0121481 A1 | 7/2003 | Dodd et al. |
| 2003/0158630 A1 | 8/2003 | Pham et al. |
| 2003/0167660 A1 | 9/2003 | Kondou |
| 2003/0178994 A1 | 9/2003 | Hurlimann et al. |
| 2003/0188536 A1 | 10/2003 | Mittricker |
| 2003/0197622 A1 | 10/2003 | Reynard et al. |
| 2003/0227821 A1 | 12/2003 | Bae et al. |
| 2004/0057334 A1 | 3/2004 | Wilmer et al. |
| 2004/0058597 A1 | 3/2004 | Matsuda |
| 2004/0067126 A1 | 4/2004 | Schmidt |
| 2004/0125688 A1 | 7/2004 | Kelley et al. |
| 2004/0249105 A1 | 12/2004 | Nolte et al. |
| 2004/0265653 A1 | 12/2004 | Buechi et al. |
| 2005/0007450 A1 | 1/2005 | Hill et al. |
| 2005/0058016 A1 | 3/2005 | Smith et al. |
| 2005/0146437 A1 | 7/2005 | Ward |
| 2005/0150820 A1 | 7/2005 | Guo |
| 2005/0154132 A1 | 7/2005 | Hakuta et al. |
| 2005/0284333 A1 | 12/2005 | Falkiewicz |
| 2006/0125826 A1 | 6/2006 | Lubkowitz |
| 2006/0278304 A1 | 12/2006 | Mattingly et al. |
| 2007/0175511 A1 | 8/2007 | Doerr |
| 2008/0092625 A1 | 4/2008 | Hinnrichs |
| 2008/0113884 A1 | 5/2008 | Campbell et al. |
| 2008/0115834 A1 | 5/2008 | Geoffrion et al. |
| 2008/0149481 A1 | 6/2008 | Hurt |
| 2008/0283083 A1 | 11/2008 | Piao |
| 2009/0009308 A1 | 1/2009 | Date et al. |
| 2009/0107111 A1 | 4/2009 | Oliver |
| 2009/0175738 A1 | 7/2009 | Shaimi |
| 2009/0183498 A1 | 7/2009 | Uchida et al. |
| 2009/0188565 A1 | 7/2009 | Satake |
| 2009/0197489 A1 | 8/2009 | Caro |
| 2010/0031825 A1 | 2/2010 | Kemp |
| 2010/0049410 A1 | 2/2010 | McKee |
| 2010/0058666 A1 | 3/2010 | Kim |
| 2011/0265449 A1 | 11/2011 | Powell |
| 2012/0092835 A1 | 4/2012 | Miller |
| 2012/0143560 A1 | 6/2012 | Tabet et al. |
| 2012/0185220 A1 | 7/2012 | Shippen |
| 2012/0276379 A1 | 11/2012 | Daniels et al. |
| 2012/0304625 A1 | 12/2012 | Daikoku |
| 2013/0035824 A1 | 2/2013 | Nakamura |
| 2013/0048094 A1 | 2/2013 | Ballantyne |
| 2013/0062258 A1 | 3/2013 | Ophus |
| 2013/0125323 A1 | 5/2013 | Henderson |
| 2013/0176656 A1 | 7/2013 | Kaisser |
| 2013/0186671 A1 | 7/2013 | Theis |
| 2013/0201025 A1 | 8/2013 | Kamalakannan et al. |
| 2013/0245524 A1 | 9/2013 | Schofield |
| 2013/0293884 A1 | 11/2013 | Lee et al. |
| 2013/0299500 A1 | 11/2013 | McKinnon |
| 2014/0002639 A1 | 1/2014 | Cheben et al. |
| 2014/0008926 A1 | 1/2014 | Allen |
| 2014/0062490 A1 | 3/2014 | Neuman et al. |
| 2014/0090379 A1 | 4/2014 | Powell et al. |
| 2014/0121622 A1 | 5/2014 | Jackson et al. |
| 2014/0158616 A1 | 6/2014 | Govind et al. |
| 2014/0158632 A1 | 6/2014 | Govind et al. |
| 2014/0171538 A1 | 6/2014 | Daniels et al. |
| 2014/0176344 A1 | 6/2014 | Littlestar |
| 2014/0190691 A1 | 7/2014 | Vinegar |
| 2014/0194657 A1 | 7/2014 | Wadhwa et al. |
| 2014/0299039 A1 | 10/2014 | Trollux |
| 2014/0345370 A1 | 11/2014 | Marotta |
| 2014/0356707 A1 | 12/2014 | Kwon et al. |
| 2015/0081165 A1 | 3/2015 | Yamashita et al. |
| 2015/0144468 A1 | 5/2015 | Skolozdra |
| 2015/0183102 A1 | 7/2015 | Breschi et al. |
| 2015/0198518 A1 | 7/2015 | Borin et al. |
| 2015/0244087 A1 | 8/2015 | Wing |
| 2015/0323119 A1 | 11/2015 | Giunta |
| 2016/0091467 A1 | 3/2016 | Morris |
| 2016/0139355 A1 | 5/2016 | Petersen |
| 2016/0169098 A1 | 6/2016 | Makita |
| 2016/0169436 A1 | 6/2016 | Sander et al. |
| 2016/0175634 A1 | 6/2016 | Radian |
| 2016/0238194 A1 | 8/2016 | Adler et al. |
| 2016/0252650 A1 | 9/2016 | Hirst, Sr. |
| 2016/0363249 A1 | 12/2016 | Disher |
| 2016/0369930 A1 | 12/2016 | Poe et al. |
| 2017/0051472 A1 | 2/2017 | Mochimaru |
| 2017/0088401 A1 | 3/2017 | Clements et al. |
| 2017/0122174 A1 | 5/2017 | Patel |
| 2017/0131728 A1 | 5/2017 | Lambert et al. |
| 2017/0158303 A1 | 6/2017 | Michaelis et al. |
| 2017/0248569 A1 | 8/2017 | Lambert et al. |
| 2017/0253737 A1 | 9/2017 | Auld et al. |
| 2017/0253738 A1 | 9/2017 | Auld et al. |
| 2017/0253806 A1 | 9/2017 | Auld et al. |
| 2017/0254481 A1 | 9/2017 | Cadogan et al. |
| 2017/0259229 A1 | 9/2017 | Chou et al. |
| 2017/0306428 A1 | 10/2017 | Helgason et al. |
| 2017/0326474 A1 | 11/2017 | Olovsson |
| 2017/0367346 A1 | 12/2017 | Rees et al. |
| 2018/0002617 A1 | 1/2018 | Umansky et al. |
| 2018/0003116 A1 | 1/2018 | Fersman et al. |
| 2018/0037452 A1 | 2/2018 | Gray et al. |
| 2018/0080356 A1 | 3/2018 | Fukui |
| 2018/0119882 A1 | 5/2018 | Allidieres et al. |
| 2018/0143734 A1 | 5/2018 | Ochenas et al. |
| 2018/0186528 A1 | 7/2018 | Tonn |
| 2018/0223202 A1 | 8/2018 | Fransham et al. |
| 2018/0245313 A1 | 8/2018 | Shibamori et al. |
| 2018/0259064 A1 | 9/2018 | McLemore |
| 2018/0312391 A1* | 11/2018 | Borg ............... B67D 7/3218 |
| 2019/0016963 A1 | 1/2019 | Auld et al. |
| 2019/0121373 A1 | 4/2019 | Panigrahi |
| 2019/0367732 A1 | 5/2019 | Helgason et al. |
| 2019/0270500 A1 | 9/2019 | Hamaoka |
| 2019/0338203 A1 | 11/2019 | Umansky et al. |
| 2019/0359899 A1 | 11/2019 | Umansky et al. |
| 2019/0136060 A1 | 12/2019 | Helgason et al. |
| 2019/0368054 A1 | 12/2019 | Gummow et al. |
| 2019/0368156 A1 | 12/2019 | Faivre |

(56) References Cited

U.S. PATENT DOCUMENTS

| | | | |
|---|---|---|---|
| 2020/0118413 A1 | 4/2020 | Kanukurthy et al. |
| 2020/0232191 A1 | 7/2020 | Prior |
| 2020/0245551 A1 | 8/2020 | Hoffman et al. |
| 2020/0245552 A1 | 8/2020 | Hoffman et al. |
| 2020/0245553 A1 | 8/2020 | Hoffman et al. |
| 2020/0292445 A1 | 9/2020 | Morimoto |
| 2020/0325742 A1 | 10/2020 | Astudillo et al. |
| 2021/0053011 A1 | 2/2021 | Sugiyama et al. |
| 2021/0062697 A1 | 3/2021 | Yokoyama et al. |
| 2021/0073692 A1 | 3/2021 | Saha et al. |
| 2021/0076006 A1 | 3/2021 | O'Neill et al. |
| 2021/0123211 A1 | 4/2021 | Miller et al. |
| 2021/0138399 A1 | 5/2021 | Yokoyama et al. |
| 2021/0197151 A1 | 7/2021 | Miller |
| 2021/0207772 A1 | 7/2021 | Norton et al. |
| 2021/0215925 A1 | 7/2021 | Kim et al. |
| 2021/0216852 A1 | 7/2021 | Reece et al. |
| 2021/0232163 A1 | 7/2021 | Miller |
| 2021/0232741 A1 | 7/2021 | Ogiso et al. |
| 2021/0362637 A1 * | 11/2021 | Hanis ................. B60P 3/226 |
| 2021/0381920 A1 | 12/2021 | Jacobsz et al. |
| 2022/0001969 A1 | 1/2022 | Pugnetti |
| 2022/0010707 A1 | 1/2022 | Sharma et al. |
| 2022/0048606 A1 | 2/2022 | Singh |
| 2022/0081261 A1 | 3/2022 | Karbassi |
| 2022/0087099 A1 | 3/2022 | Hoffman et al. |
| 2022/0154427 A1 | 5/2022 | Misaki |
| 2022/0178114 A1 | 6/2022 | Takahama |
| 2022/0186470 A1 | 6/2022 | Chiba et al. |
| 2022/0213603 A1 | 7/2022 | Al Eid et al. |
| 2022/0221368 A1 | 7/2022 | Bergeron |
| 2022/0228345 A1 | 7/2022 | Case et al. |
| 2022/0282651 A1 | 9/2022 | Reynolds et al. |
| 2022/0290411 A1 | 9/2022 | Anahara et al. |
| 2022/0343229 A1 | 10/2022 | Gruber et al. |
| 2022/0401899 A1 | 12/2022 | Miller |
| 2022/0404272 A1 | 12/2022 | Kendall et al. |
| 2023/0015077 A1 | 1/2023 | Kim |
| 2023/0061824 A1 | 3/2023 | Ell |
| 2023/0078852 A1 | 3/2023 | Campbell et al. |
| 2023/0129513 A1 | 4/2023 | Miller |
| 2023/0259080 A1 | 8/2023 | Whikehart et al. |
| 2023/0259088 A1 | 8/2023 | Borup et al. |
| 2023/0332532 A1 | 10/2023 | Thobe |
| 2023/0333577 A1 | 10/2023 | Miller |
| 2023/0333578 A1 | 10/2023 | Miller |
| 2023/0341092 A1 | 10/2023 | Thobe |
| 2023/0347303 A1 | 11/2023 | Miller |
| 2023/0358023 A1 | 11/2023 | Jordan et al. |
| 2023/0366510 A1 | 11/2023 | Thobe |
| 2023/0383416 A1 | 11/2023 | Ell |
| 2023/0383417 A1 | 11/2023 | Ell |
| 2023/0383418 A1 | 11/2023 | Ell |
| 2023/0392536 A1 | 12/2023 | Thobe |
| 2023/0399817 A1 | 12/2023 | Jordan |
| 2023/0399818 A1 | 12/2023 | Jordan |
| 2023/0407488 A1 | 12/2023 | Ell |
| 2023/0415106 A1 | 12/2023 | Miller |
| 2024/0003016 A1 | 1/2024 | Ell |
| 2024/0060189 A1 | 2/2024 | Ell |

FOREIGN PATENT DOCUMENTS

| | | | |
|---|---|---|---|
| CA | 2447358 A1 * | 4/2005 | ............ B60P 3/226 |
| CA | 2702151 | 10/2007 | |
| CA | 2637421 | 1/2010 | |
| CA | 2642295 | 1/2010 | |
| CA | 2736733 | 10/2011 | |
| CA | 2958443 | 4/2017 | |
| CA | 2995532 | 4/2017 | |
| CA | 2916141 | 6/2017 | |
| CN | 2092562 | 1/1992 | |
| CN | 200958686 | 10/2007 | |
| CN | 100348970 | 11/2007 | |
| CN | 102997052 | 3/2013 | |
| CN | 103106764 | 5/2013 | |
| CN | 103497804 | 1/2014 | |
| CN | 102997061 | 5/2015 | |
| CN | 204824775 | 12/2015 | |
| CN | 205640252 | 10/2016 | |
| CN | 106764463 | 1/2019 | |
| CN | 110513604 | 11/2019 | |
| CN | 210176958 | 3/2020 | |
| CN | 111537157 | 8/2020 | |
| CN | 114001278 | 2/2022 | |
| CN | 114877263 | 4/2023 | |
| EP | 2602609 | 6/2013 | |
| EP | 3076461 | 10/2016 | |
| EP | 3101411 | 12/2016 | |
| EP | 3112011 | 1/2017 | |
| EP | 2994626 | 1/2018 | |
| EP | 3285759 | 2/2018 | |
| ES | 2398302 | 3/2013 | |
| FR | 2388762 | 11/1978 | |
| FR | 2689241 | 10/1993 | |
| GB | 1179978 | 2/1970 | |
| GB | 2097687 | 11/1982 | |
| GB | 2545207 | 6/2017 | |
| GB | 2559149 | 4/2022 | |
| IN | 202141001384 | 1/2021 | |
| IT | 201900008235 | 12/2020 | |
| JP | 2004125039 | 4/2004 | |
| JP | 2007204023 | 8/2007 | |
| JP | 2008097832 | 4/2008 | |
| JP | 2012002159 | 11/2014 | |
| JP | 2016078893 | 5/2016 | |
| KR | 20110010316 | 2/2011 | |
| KR | 20130038986 | 4/2013 | |
| KR | 102129951 | 7/2020 | |
| KR | 102169280 | 10/2020 | |
| KR | 102281640 | 7/2021 | |
| RU | 2760879 | 12/2021 | |
| WO | 1996006685 | 5/1996 | |
| WO | 1997006004 | 2/1997 | |
| WO | 1997006298 | 2/1997 | |
| WO | 1998003711 | 1/1998 | |
| WO | 2000063108 | 10/2000 | |
| WO | 2002030551 | 4/2002 | |
| WO | 2003003002 | 1/2003 | |
| WO | 2003066423 | 8/2003 | |
| WO | 2004003293 | 1/2004 | |
| WO | 2004092307 | 10/2004 | |
| WO | 2005018300 | 3/2005 | |
| WO | 2007107652 | 9/2007 | |
| WO | 2007112335 | 10/2007 | |
| WO | 2007149851 | 12/2007 | |
| WO | 2009013544 | 1/2009 | |
| WO | 2009055024 | 4/2009 | |
| WO | 2010042704 | 4/2010 | |
| WO | 2010103260 | 9/2010 | |
| WO | 2013112274 | 8/2013 | |
| WO | 2014089443 | 6/2014 | |
| WO | 2014173672 | 10/2014 | |
| WO | 2015061868 | 5/2015 | |
| WO | 2015153607 | 10/2015 | |
| WO | 2016004107 | 1/2016 | |
| WO | 2016026043 | 2/2016 | |
| WO | 2016146404 | 9/2016 | |
| WO | 2017074985 | 5/2017 | |
| WO | 2017083778 | 5/2017 | |
| WO | 2017087731 | 5/2017 | |
| WO | 2017152269 | 9/2017 | |
| WO | 2018005141 | 1/2018 | |
| WO | 2018102378 | 6/2018 | |
| WO | 2020044026 | 3/2020 | |
| WO | 2020118020 | 6/2020 | |
| WO | 2020132632 | 6/2020 | |
| WO | 2020223803 | 11/2020 | |
| WO | 2020237112 | 11/2020 | |
| WO | 2021062563 | 4/2021 | |
| WO | 2021100054 | 5/2021 | |
| WO | 2022043197 | 3/2022 | |
| WO | 2022126092 | 6/2022 | |
| WO | 2022149501 | 7/2022 | |

(56) References Cited

FOREIGN PATENT DOCUMENTS

| WO | 2023287276 | 1/2023 |
|---|---|---|
| WO | 2023038579 | 3/2023 |
| WO | 2023137304 | 7/2023 |
| WO | 2023164683 | 8/2023 |
| ZA | 9606765 | 2/1998 |
| ZA | 200610366 | 1/2008 |

OTHER PUBLICATIONS

Skelton et al., Onboard Refueling Vapor Recovery Systems Analysis of Widespread Use, Nescaum, Boston MA, Aug. 20, 2007.
Membrane Technology and Research, Inc., Gasoline Vapor Recovery, 2018.
Jordan Technologies, Aereon, Recovering More Vapor = Increased Profits, 2015.
EPFL, Capturing CO2 from trucks and reducing their emissions by 90%, Dec. 23, 2019.
Sharma, Shivom et al., Carbon Dioxide Capture from Internal Combustion Engine Exhaust Using Temperature Swing Adsorption, Front. Energy Res., Sec. Carbon Capture, Utilization and Storage, Dec. 16, 2019.
Information Disclosure Declaration by Kyle E. Miller, Dec. 18, 2020.
Cott Manufacturing Company, FinkLet®/FinkPlate® Cathodic Proection Test Stations, Wayback Machine, May 22, 2000.
Neutrik XXR-2 XX Series, https://www.parts-express.com/Neutrik-XXR-2-XX-Series-Color-Coding_Ring-Red, 2022.
Hou, Qingmin, An FBG Strain Sensor-Based NPW Method for Natural Gas Pipeline Leakage Detection, Hindawi, Mathematical Problems in Engineering, vol. 2021, Article ID 5548503, pp. 1-8.
Alexandrakis et al., "Marine Transportation for Carbon Capture and Sequestration (CCS)", Department of Civil and Environmental Engineering, Thesis, Massachusetts Institute of Technology, Jun. 2010.
Datta et al., "Advancing carbon management through the global commoditization of CO2: the case for dual-use LNG-CO2 shipping", Carbon Management, 2020, vol. 11, No. 6, 611-630.
Ibitoye et al., "Poster Abstract: A Convolutional Neural Network Based Solution for Pipeline Leak Detection", School of Information Technology, Carleton University, Ottawa, Canada, Nov. 2019.
IntelliView, "Thermal Imaging Provides Early Leak Detection in Oil and Gas Pipelines", Petro Industry News, www.Petro-Online.com, Aug./Sep. 2018.
Southwest Research Institute, "Methane Leak Detection", 2021.
Masterduct, "Case Studies: High temp marine grade ship engine exhaust fume hose", retrieved at https://www.masterduct.com/CaseStudies/Hightempshipengineexhaustfumehose.aspx.
ACTI, "Advanced Maritime Emissions Control System (AMECS)", retrieved at https://sustainableworldports.org/wp-content/uploads/presentation-on-AMECS.pdf.

* cited by examiner

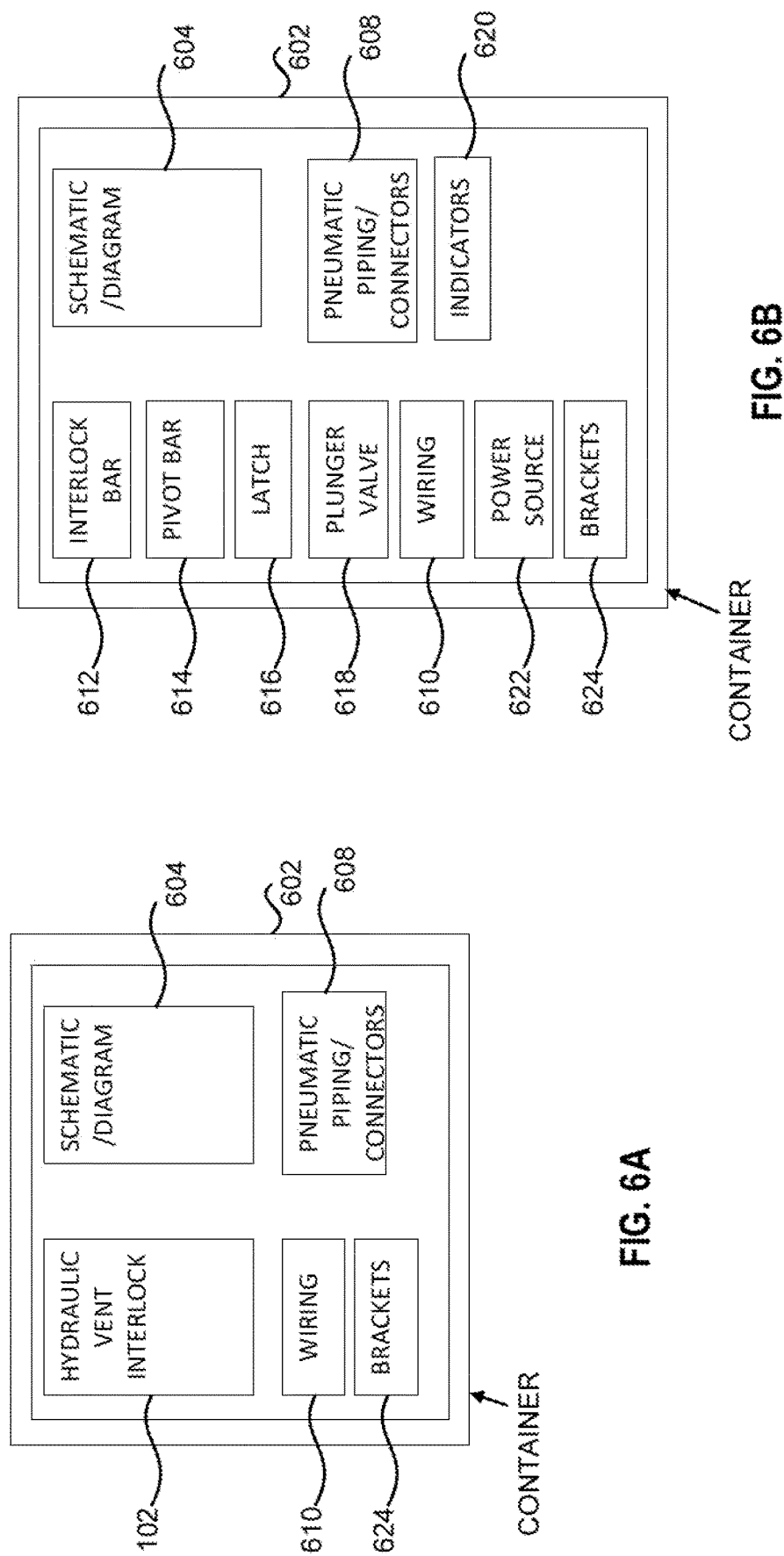

SYSTEMS AND METHODS FOR A HYDRAULIC VENT INTERLOCK

PRIORITY CLAIM

The present application claims priority to and the benefit of U.S. Provisional Application No. 63/478,052, filed Dec. 30, 2022, titled "SYSTEMS AND METHODS FOR A HYDRAULIC VENT INTERLOCK," the disclosure of which is incorporated herein by reference in its entirety.

FIELD OF DISCLOSURE

Embodiments of this disclosure relate to vent interlock installation and/or mounting systems and methods, and more particularly, to systems and methods to prevent vehicle operation while a vent cover is open by locking and unlocking brakes of the vehicle and/or activating one or more indicators positioned on and/or in the vehicle based on the vent cover interlock position.

BACKGROUND

Trailers used to transport asphalt and/or other liquids between locations may include a manway and a manually and/or remotely openable manhole or vent cover covering an aperture or opening positioned at an upper portion or top of the trailer to allow vapors that may form during transit to vent cover from the interior of the trailer and ambient air to enter the interior of the trailer as the asphalt and/or other liquid is pumped from the trailer. The aperture or opening prevents the trailer from collapsing or imploding due to the pressure inside the trailer dropping as the asphalt and/or other liquid is pumped from the trailer. Typically, such trailers are considered non-code trailers and are not subject to the strict regulations for other trailers carrying hazardous materials. Further, while some operators and/or drivers may close the manhole or vent cover prior to transport, often the manhole or vent cover may remain open due to operator and/or driver error.

In the event that the manhole or vent cover is left open during transportation, vapor may be released to the atmosphere and/or asphalt and/or other liquids therein may slosh or spill from the trailer. Further, water may enter the tank in such events, based on environmental conditions (for example, rain or snow). Further still, the hydraulic pump assembly utilized to remotely operate the manhole or vent cover may move during transportation and cause the manhole or vent cover to inadvertently open.

SUMMARY

Accordingly, Applicant has recognized a need for systems and methods that reduce risk of transporting asphalt and/or other liquids in a trailer with an open manhole or vent cover. The present disclosure may address one or more of the above-referenced drawbacks or risks, as well as other possible drawbacks or risks.

The present disclosure is generally directed to embodiments of systems and methods for vent interlock installation and/or mounting systems and methods, and more particularly, to systems and methods to prevent vehicle operation while a vent cover is open by locking and unlocking brakes of the vehicle and/or activating one or more indicators positioned on and/or in the vehicle based on the vent interlock position. The vent interlock may be installed, mounted, and/or positioned proximate a hydraulic pump assembly of the trailer. The hydraulic pump assembly may be positioned, for example, at the rear, front, or either side of the trailer. The hydraulic pump assembly may include a valve. The valve may be actuatable via a valve handle. The valve handle may open the valve of the hydraulic pump assembly to bleed pressure from a hydraulic circuit or line or close the valve to thereby allow pressure to be increased in the hydraulic circuit or line. The hydraulic circuit or line may connect to and/or be in fluid communication with a manhole or vent cover. Once the pressure within the hydraulic circuit or line exceeds a pressure threshold, then the manhole or vent cover may open, thus allowing vapor to escape a tank of the trailer and/or ambient air to enter the tank of the trailer. The valve handle may be actuated to an open position to cause the manhole or vent cover to close, as pressure decreases over time. The hydraulic pump assembly may include a hydraulic pump handle configured to and/or positioned on the hydraulic pump assembly to allow or enable a user or operator to increase the pressure within the hydraulic circuit or line when the valve handle is in a closed position. The user or operator may pull the hydraulic pump handle back and up and then push the hydraulic pump handle forward and down, repetitively, (for example, a pumping motion) to cause pressure to increase within the hydraulic circuit or line.

As noted, to cause the manhole or vent cover to close, the user or operator may actuate the valve handle to an open position. Such actions may or may not be performed prior to transportation. As such, the hydraulic vent interlock may prevent the vehicle from operating until the valve handle is actuated to the open position. In such embodiments, the hydraulic vent interlock may include a pivot bar with a proximal end fixedly or removably attached or connected to the trailer proximate to the hydraulic pump assembly. The pivot bar may be a single solid bar, a hollow bar, a u-shaped bar, or two bars positioned parallel to one another. The pivot bar may include at least one aperture at a distal end to allow a pin, cam, or detent to pass therethrough. The hydraulic vent interlock may include an interlock bar. The interlock bar may include corresponding mechanical features (for example, apertures, linkages, or other connectors to attach to a pin, cam, or detent) at a proximal end to enable connection of the interlock bar to the pivot bar. The interlock bar may pivot about the pivot bar. In an embodiment, the pivot bar may include a stop or other mechanism to prevent the interlock bar from pivoting past a selected distance. The interlock bar may include a notch or aperture equidistant from the proximal end to the distal end of the interlock bar. In another embodiment, the notch or aperture may be positioned closer to the proximal end or the distal end. In a further embodiment, the notch or aperture may be formed on-site (for example, during installation) and, as such, the position of the notch or aperture may vary based on the chosen location of the hydraulic vent interlock.

In an embodiment, the hydraulic vent interlock may include a latch. The latch may be a spring operated latch. The spring operated latch may include two fixed members or plates, a spring positioned between the two fixed members or plates, and the plunger passing through apertures in each of the two fixed members and through the spring. The spring may be fixed to the plunger, for example, via a pin or other mechanism connecting the spring to the rod. The plunger may include a handle or curved portion and a and may correspond to the aperture or notch on the interlock bar. At rest, the spring may hold the plunger in an extended position, holding the plunger, when the interlock bar is in a lowered position, such that the plunger extends through the aperture or notch in the interlock bar. As an operator pulls the handle out and when the interlock bar is in a lowered position, the spring may compress and the plunger may recede from the aperture or notch, allowing a user or operator to lift the interlock bar.

When the interlock bar is latched or engaged with the latch, the interlock bar may prevent the movement of the valve handle of the hydraulic pump assembly. When the interlock bar is not engaged with the latch, then the interlock bar may pivot about the pivot bar. Further, the hydraulic vent interlock may include a valve or plunger valve in fluid communication with the trailer's brake subsystem. When the interlock bar is in the lowered position, the valve may be depressed or actuated to an open position, while when the interlock bar is in the raised position, the valve may be raised or closed. When the valve is depressed or opened, air may flow to a controller or relay of the trailer brake subsystem causing the brakes to engage or lock. When the valve is raised or close, air may be prevented from flowing to the brake subsystem, thus causing the brakes to disengage or unlock. Thus, while a vent cover or manhole cover is open, the brakes may be locked or engaged, preventing further movement or transportation.

Further, one or more indicators may be positioned throughout the trailer or cab which the trailer is attached to. For example, the interlock bar may include one or more indicators, such as lights, LEDs, sound emitting devices, and/or other indicators. The indicators may activate when the interlock bar is in the raised position. Other indicators may include an indicator located in the dashboard of the cab of the truck or vehicle, an indicator positioned on a side mirror of the cab of the truck or vehicle, or at other locations within the cab of the truck or vehicle, among other locations of the trailer.

Accordingly, an embodiment of the disclosure is directed to a system to prevent operation of a transportation vehicle while a vent cover remains open. The system may include a hydraulic pump assembly connected to a trailer of the transportation vehicle. The hydraulic pump assembly may include a hydraulic line or hydraulic circuit in fluid communication with a vent cover or manhole cover. The hydraulic pump assembly may include a hydraulic valve positioned along the hydraulic line. The hydraulic pump assembly may include a hydraulic valve handle connected to the hydraulic valve. The hydraulic valve handle may be movable between an open position, to open the hydraulic valve to release or bleed pressure from the hydraulic line or hydraulic circuit, and a closed position, to close the hydraulic valve. The hydraulic pump assembly may include a pump handle to cause the vent cover positioned on the transportation vehicle to open when the hydraulic valve handle is in the closed position and when the pump handle is actuated. The system may include a pivot bar connected to the trailer of the transportation vehicle and proximate the hydraulic pump assembly. The system may include an interlock bar attached to the pivot bar. The interlock bar may rotate about the pivot bar to a lowered position and a raised position. The interlock bar in the lowered position may prevent the hydraulic valve handle from moving from the open position to the closed position and the hydraulic valve handle may prevent the interlock bar from moving to the raised position to the lowered position when the hydraulic valve handle is in the closed position. The system may include a plunger valve connected to brakes of the transportation vehicle. The plunger valve may be configured to be depressed when the interlock bar is in the lowered position to unlock brakes of the transportation vehicle and to be released when the interlock bar is in the raised position to lock the brakes of the transportation vehicle. The system may include a latch attached to the transportation vehicle to, when latched and when the interlock bar is in the lowered position, hold the interlock bar in the lowered position via a notch or aperture in the interlock bar.

In an embodiment, the latch may be a spring operated latch. In another embodiment, the interlock bar may comprise a u-shaped bar including two side walls. Each of the two side walls may include an inner surface, an outer surface, an upper edge, and a lower edge. The u-shaped bar may include a connecting wall including two outer edges. Each outer edge may connect to the upper edge of one of the two side walls. One of the two side walls may include an aperture proximate the lower edge. The latch may include a bar with a handle at a distal end. The bar may extend through the aperture of one of the two side walls when a spring of the spring operated latch is at rest.

Another embodiment of the disclosure is directed to a vent interlock system to ensure vent cover closure prior to operation of a transportation vehicle. The system may include a pivot bar connected to a trailer of the transportation vehicle and proximate a hydraulic pump assembly. The system may include an interlock bar attached to the pivot bar. The interlock bar may rotate about the pivot bar to a lowered position and a raised position, the interlock bar in the lowered position to prevent a hydraulic valve handle of the hydraulic pump assembly from moving from an open position to a closed position. The hydraulic valve handle may prevent the interlock bar from moving to the raised position to the lowered position when the hydraulic valve handle is in the closed position. The hydraulic valve handle, in the closed position, may allow a vent cover of the trailer to be opened and the hydraulic valve handle, in the open position, may cause, when the vent cover is open, the vent cover to close. The system may include a plunger valve connected to brakes of the transportation vehicle. The plunger valve may be configured to be depressed when the interlock bar is in the lowered position to unlock brakes of the transportation vehicle and to be released when the interlock bar is in the raised position to lock the brakes of the transportation vehicle to prevent operation of the transportation vehicle. The system may include a spring operated latch attached to the transportation vehicle to, when latched and when the interlock bar is in the lowered position, hold the interlock bar in the lowered position via a notch or aperture in the interlock bar.

In another embodiment, the interlock bar may include an indicator. The indicator may be activated when the interlock bar is in the raised position. The indicator may be visible from a cabin of the transportation vehicle when the interlock bar is in the raised position. The indicator may be positioned within a cabin of the transportation vehicle. The indicator may be coupled to the interlock bar. The indicator may be configured to activate when the interlock bar is in the raised position.

Another embodiment of the disclosure is directed to a vent interlock system to ensure vent cover closure prior to operation of a transportation vehicle. The system may include an interlock device positionable to a lowered position and a raised position. The interlock device may be configured to, in the lowered position, to prevent a hydraulic valve handle of a hydraulic pump assembly from moving from an opened position to a closed position and to, in the raised position, enable actuation of the hydraulic valve handle. The hydraulic valve handle to prevent the interlock device from moving from the raised position to the lowered position when the hydraulic valve handle is in the closed position. The hydraulic valve handle may, in the closed position, allow a vent cover of a trailer to be opened and may, in the open position, cause, when the vent cover is open, the vent cover to close. The system may include a plunger valve connected to brakes of the transportation vehicle, the plunger valve configured to unlock and lock the brakes of the transportation vehicle to thereby allow or prevent operation of the transportation vehicle based on a position of the interlock device.

In another embodiment, the system may include a spring operated latch attached to the transportation vehicle to, when latched and when the interlock device is in the lowered position, hold the interlock device in the lowered position via a notch or aperture in the interlock device.

In another embodiment, the plunger valve is depressed when the interlock device is in the lowered position. The plunger valve may be configured to unlock the brakes of the transportation vehicle when depressed. The plunger valve may connect to one or more of a transportation vehicle braking subsystem or a trailer braking subsystem. The connection between the plunger valve and the one or more of the transportation vehicle braking subsystem or the trailer braking subsystem may comprise one or more of an electrical connection, a hydraulic connection, or a pneumatic connection. The plunger valve may be configured to generate a signal (a) corresponding to a type of connection between the plunger valve and the brakes of the transportation vehicle and (b) to indicate locking or unlocking of the brakes. The plunger valve may be released when the interlock device is in the raised position. The plunger valve may be configured to lock the brakes of the transportation vehicle when released. The interlock device may include one or more indicators. The one or more indicators may be activated when the interlock device is in the raised position. The one or more indicators may be visible from a cabin of the transportation vehicle when the interlock device is in the raised position.

Another embodiment of the disclosure is directed to a kit to provide an interlock bar to prevent operation of a transportation vehicle while a vent cover remains open. The kit may include a container. The kit may include an interlock bar positioned in the container. The kit may include a pivot bar positioned in the container. The pivot bar may be configured to connect to the interlock bar and allow rotation of the interlock bar between a lowered position and a raised position. The kit may include a plunger valve positioned in the container. The plunger valve may be configured to connect to brakes of the transportation vehicle and proximate to the interlock bar, the interlock bar, when in the raised position to release the plunger valve and lock brakes of the transportation vehicle, thereby to prevent operation of the transportation vehicle. The kit may include a spring operated latch positioned in the container, the spring operated latch to attach to a trailer of the transportation vehicle and proximate to the interlock bar, the spring operated latch configured to hold the interlock bar in the lowered position via a notch or aperture.

In an embodiment, the kit may include one or more indicators positioned in the container. The one or more indicators may be configured to signal when the interlock bar is in the raised position and the vent cover is open. The kit may include one or more wire assemblies positioned in the container. Each of the one or more wire assemblies may correspond to and be configured to connect to each of the one or more indicators. The one or more wire assemblies may also be configured to connect to a switch positioned on the interlock bar. The interlock bar, when in the raised position, may be configured to actuate the switch to thereby provide power to the one or more indicators through the one or more wire assemblies. The kit may include a diagram positioned in the container specifying connections between one or more wire assemblies and the switch. The kit may include one or more indicators configured to connect to one or more of (a) the trailer of the transportation vehicle, (b) the interlock bar, or (c) a cabin of the transportation vehicle. The kit may include a plurality of brackets positioned in the container, wherein the plurality of brackets attach to each of (1) the pivot bar and (2) the interlock bar and configured to fasten the pivot bar to the rear of the trailer of the transportation vehicle and connect the interlock bar to the pivot bar. The kit may include one or more indicators positioned in the container, the one or more indicators configured to connect to the interlock bar and a power source, the one or more indicators to receive power from the power source when the interlock bar is in the raised position to thereby indicate that the vent cover is open.

Another embodiment of the disclosure is directed to a method to prevent operation of a transportation vehicle while a vent cover remains open. The method may include connecting a pivot bar to a trailer of the transportation vehicle. The method may include connecting an interlock bar to a fixed point on the pivot bar, the interlock bar to rotate about the pivot bar to a lowered position and a raised position. The method may include connecting a plunger valve to a transportation vehicle brakes, the plunger valve configured to be depressed when the interlock bar is in the lowered position to thereby unlock the transportation vehicle brakes of the transportation vehicle, and to be released when the interlock bar is in the raised position to thereby lock the transportation vehicle brakes of the transportation vehicle. The method may include attaching a spring operated latch to the trailer of the transportation vehicle, the spring operated latch configured to prevent or allow rotation of the interlock bar, the spring operated latch positioned to hold the interlock bar in the lowered position.

In another embodiment, the method may include positioning one or more indicators on one or more of: (a) the interlock bar, (b) one or more sides of the transportation vehicle, or (c) in a cabin of the transportation vehicle. In another embodiment, the method may include, connecting the one or more indicators to a first end of one or more wire assemblies, a second end of one or more wire assemblies connected to a power source or a battery to thereby provide power to the one or more indicators when the interlock bar is in the raised position. The one or more indicators may include one or more visual indicators. The spring operated latch may be connected to the interlock bar via a notch or aperture in the interlock bar. The spring operated latch may be attached to the trailer of the transportation vehicle via one or more fasteners or mechanical connections.

The method may further include mounting one or more indicators to one or more of (1) the transportation vehicle or (2) the trailer of the transportation vehicle. The method may include attaching a first end of one of one or more wire assemblies to each of one or more indicators. The method may include passing each of the one or more wire assemblies through the trailer of the transportation vehicle to a cabin of the transportation vehicle. The method may include connecting a second end of one of the one or more wire assemblies to a switch positioned proximate the interlock bar, the switch to create a circuit, when the interlock bar is in the raised position, between a power source and one or more indicators to thereby activate the one or more indicators.

The one or more indicators may be positioned at one or more of (1) the trailer of the transportation vehicle and proximate to the interlock bar or (2) in the cabin of the transportation vehicle. The power source may comprise a battery positioned on the trailer of the transportation vehicle. The one or more indicators comprise one or more lights.

Another embodiment of the disclosure is directed to a method to prevent operation of a transportation vehicle while a vent cover remains open. The method may include releasing a spring operated latch connected to the transportation vehicle, the spring operated latch to disengage from a notch or aperture in an interlock bar to thereby enable the interlock bar to rotate about a pivot bar, the pivot bar connected to a trailer of the transportation vehicle and proximate a hydraulic pump assembly, the hydraulic pump assembly to include a hydraulic line, a hydraulic valve handle connected to a hydraulic valve and a hydraulic pump handle. The method may include rotating the interlock bar to one or more of: (1) a lowered position, or (2) a raised position, the interlock bar positioned proximate the hydraulic valve handle, the hydraulic pump handle, and a plunger valve, the interlock bar configured to allow or prevent rotation of the hydraulic valve handle between a closed position and an open position, and cause the plunger valve to move between the raised position and the lowered position, the plunger valve connected to brakes of the transportation vehicle, the plunger valve configured to lock the brakes of the transportation vehicle when the plunger valve is raised to thereby prevent operation of the transportation vehicle. The method may include actuating the hydraulic pump handle to cause the vent cover positioned on the transportation vehicle to open.

In another embodiment, the method may include, if the interlock bar is in the raised position, actuating the interlock bar from the raised position to the lowered position, the interlock bar configured to prevent rotation of the hydraulic valve handle from the open position to the closed position and operation of the hydraulic pump handle when the interlock bar is in the lowered position.

In an embodiment, actuating the interlock bar from the raised position to the lowered position causes the plunger valve to depress, the plunger valve configured to unlock the brakes of the transportation vehicle when the plunger valve is depressed to thereby allow operation of the transportation vehicle. The interlock bar may include an indicator positioned on the interlock bar. The indicator may activate when the interlock bar is released to thereby alert a driver that the interlock bar is open and the brakes of the transportation vehicle are set.

Another embodiment of the disclosure is directed to a method to prevent operation of a transportation vehicle while a vent cover remains open. The method may include releasing a spring operated latch connected to a trailer of the transportation vehicle, the spring operated latch to disengage from a notch or aperture on an interlock bar to thereby enable the interlock bar to rotate about a pivot bar, the pivot bar connected to the trailer of the transportation vehicle and proximate to a hydraulic pump assembly. The method may include actuating the interlock bar from a lowered position to a raised position, the interlock bar positioned proximate a plunger valve and a hydraulic valve handle of the hydraulic pump assembly, the interlock bar configured to release the plunger valve when the interlock bar is in the raised position, the plunger valve connected to a brake system of the transportation vehicle and configured to lock the brake system of the transportation vehicle when the plunger valve is released. The method may include rotating the hydraulic valve handle of the hydraulic pump assembly from an open position to a closed position, the hydraulic valve handle connected to a hydraulic valve positioned along a hydraulic line of the hydraulic pump assembly, the hydraulic valve, when in the closed position, configured to allow pressure to build within the hydraulic line. The method may include actuating a pump handle of the hydraulic pump assembly, when the hydraulic valve handle is in the closed position, to an active position to thereby cause the vent cover of the transportation vehicle to open.

In an embodiment, the method may include if the hydraulic valve handle of the hydraulic pump assembly is in the closed position, rotating the hydraulic valve handle from the closed position to the open position to thereby cause the hydraulic valve to close, the hydraulic valve, when in the closed position, to release pressure in the hydraulic line to thereby cause the vent cover of the transportation vehicle to close. The spring operated latch may be fastened or mechanically attached to the transportation vehicle. The method may include, if the interlock bar is in the raised position, actuating the interlock bar from the raised position to the lowered position, the interlock bar, when in the lowered position, configured to prevent rotation of the hydraulic valve handle from the open position to the closed position and depress the plunger valve connected to the brake system of the transportation vehicle thereby unlocks the brake system of the transportation vehicle and allows for operation of the transportation vehicle.

Another embodiment of the disclosure is directed to a non-transitory machine-readable storage medium storing processor-executed instructions that, when executed by at least one processor, cause the at least one processor to determine a position of an interlock bar attached to a trailer of a transportation vehicle via a pivot bar, the interlock bar actuatable to a raised position from a lowered position and to the lowered position from the raised position. The executed instructions may further cause the processor to, in response to detection of the interlock bar in the raised position, (1) activate one or more indicators positioned on a surface of the transportation vehicle, the one or more indicators in an activated state to indicate that a vent cover is open and the transportation vehicle is inoperable; and (2) in response to detection of the interlock bar in the lowered position de-activate one or more indicators positioned on the surface of the transportation vehicle, the one or more indicators in a deactivated state to indicate that the vent cover is closed and the transportation vehicle is operable. The one or more indicators may comprise visual indicators.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other implementations, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure.

FIG. 6A and FIG. 6B are simplified diagrams illustrating a kit including the hydraulic vent interlock, according to one or more embodiments of the disclosure.

DETAILED DESCRIPTION

Figure 1A:
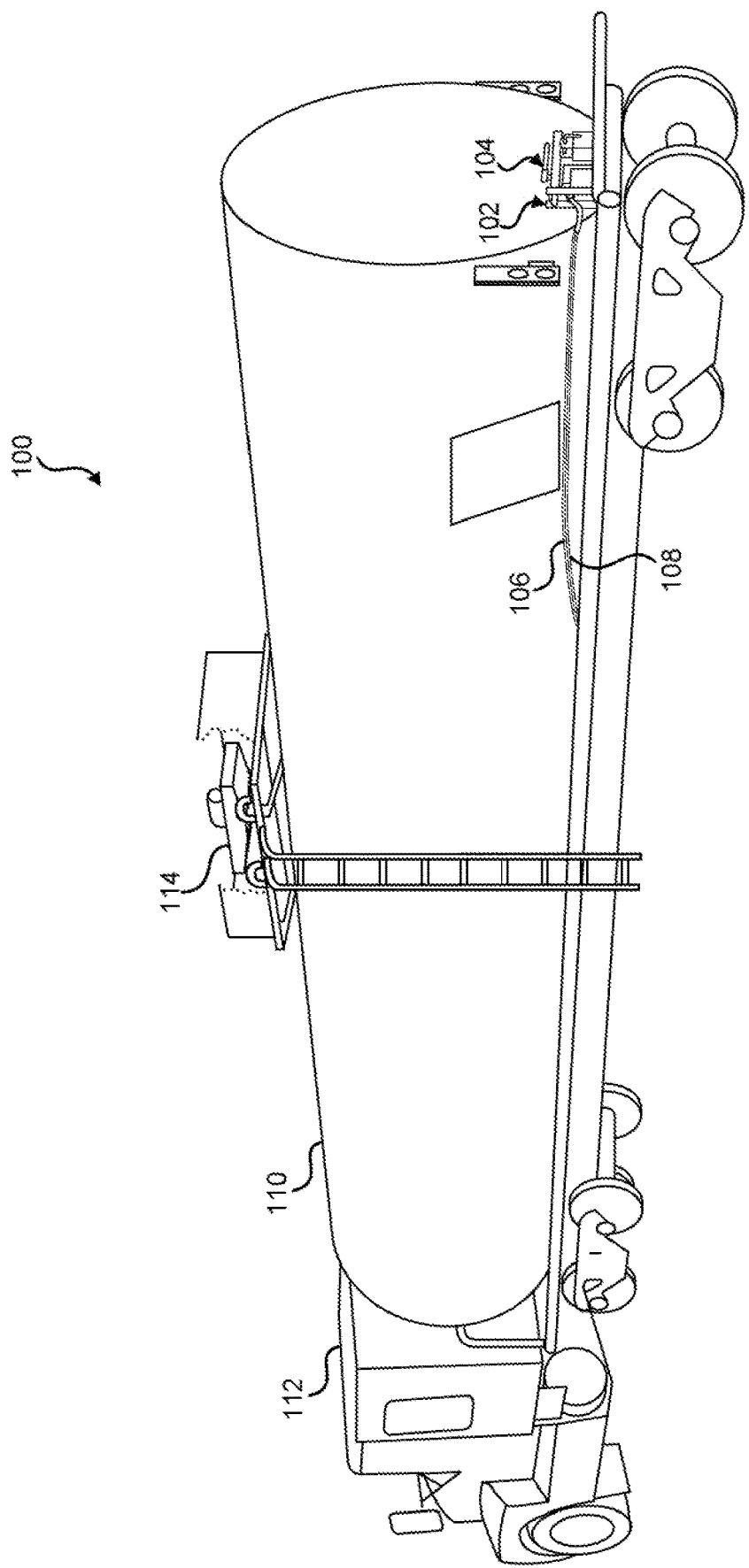
FIG. 1A, FIG. 1B, FIG. 1C, FIG. 1D, FIG. 1E, and FIG. 1F are diagrams illustrating a trailer with a hydraulic vent interlock, according to one or more embodiments of the disclosure.

So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

Typical trailers or non-code trailers include a vent cover or manhole cover located at an upper portion of the trailer. The vent cover or manhole cover may cover an aperture or opening in a tank or trailer and allow air, via the aperture or opening, to enter the tank or trailer and/or vapor to leave the tank or trailer when the vent cover is open or raised (for example, not covering the aperture or opening). When closed, the vent cover or manhole cover may cover the aperture or opening and prevent fluid from spilling from the tank or trailer. The vent cover or manhole cover may be opened remotely (for example, via a hydraulic pump assembly) and/or manually (such as when, for example, an operator climbs to a manway and opens the vent cover or manhole cover). As noted, the vent cover or manhole cover may be opened during loading and/or offloading of product (for example, asphalt and/or other liquids). However, after loading and/or offloading operations, there is no system or apparatus that exists to ensure that the vent cover or manhole cover is closed prior to operating the vehicle (for example, driving to the next destination or location). Thus, the potential exists for asphalt and/or the other liquids to slosh and/or spill during transportation, for unintentional release of vapors, and/or for introduction of unwanted environmental elements (for example, water, debris, and/or other materials or elements) into the trailer. Further, prolonged exposure to ambient air may affect product quality. Thus, the present disclosure, as noted, is generally directed to systems and methods for vent interlock installation and/or mounting systems and methods, and more particularly, to systems and methods to prevent vehicle operation while a vent cover is open by locking and unlocking brakes of the vehicle and/or activating one or more indicators positioned on and/or in the vehicle based on the vent interlock position.

Such a system (also referred to as a vent interlock system) may include and/or a method may utilize a vent or hydraulic vent interlock. The vent interlock may be installed, mounted, and/or positioned proximate a hydraulic pump assembly of the trailer. The hydraulic pump assembly may be positioned at the rear, front, or either side of the trailer. The hydraulic pump assembly may include a valve. The valve may be actuatable via a valve handle (for example, turning the valve handle, for example, 90 degrees may cause the valve to open or close to release or prevent release of pressure). The valve handle may open the valve of the hydraulic pump assembly to bleed pressure from a hydraulic circuit or line and close the valve to thereby allow pressure to be increased in the hydraulic circuit or line. The hydraulic circuit or line may connect to and/or be in fluid communication with a manhole cover or vent cover. Once the pressure within the hydraulic circuit or line exceeds a pressure threshold, then the manhole or vent cover may open, thus allowing vapor to escape a tank of the trailer and/or ambient air to enter the tank of the trailer. The valve handle may be actuated to an open position to bleed or release pressure causing the manhole cover or vent cover to close as pressure decreases over time. The hydraulic pump assembly may include a hydraulic pump handle configured and/or positioned on the hydraulic pump assembly to allow or enable a user or operator to increase the pressure within the hydraulic circuit or line when the valve handle is in a closed position. The user or operator may pull the hydraulic pump handle back and up and then push the hydraulic pump handle forward and down, repetitively, (for example, a pumping motion) to cause pressure to increase within the hydraulic circuit or line.

As noted, to cause the manhole cover or vent cover to close, the user or operator may actuate the valve handle to an open position. Typically, such actions may or may not be performed prior to transportation. Further, during transportation, the valve handle may inadvertently move and cause the manhole cover or vent cover to inadvertently open during transportation. As such, the hydraulic vent interlock may prevent the vehicle from operating until the valve handle is actuated to the open position to cause the manhole cover or vent cover to close and until the valve handle is locked in place. In such embodiments, the hydraulic vent interlock may include a pivot bar with a proximal end fixedly or removably attached or connected to the trailer proximate to the hydraulic pump assembly. The pivot bar may be a single solid bar, a hollow bar, a u-shaped bar, a square or rectangular hollow bar, or two bars positioned parallel to one another. The pivot bar may include at least one aperture at a distal end to allow a pin, cam, or detent to pass therethrough. The hydraulic vent interlock may include an interlock bar. The interlock bar may include corresponding mechanical features (for example, apertures, linkages, or other connectors to attach to a pin, cam, or detent) at a proximal end to enable connection of the interlock bar to the pivot bar. The interlock bar may pivot about the pivot bar. In an embodiment, the pivot bar may include a stop or other mechanism to prevent the interlock bar from pivoting past a selected distance. The interlock bar may include a notch or aperture equidistant from the proximal end to the distal end of the interlock bar. In another embodiment, the notch or aperture may be positioned closer to the proximal end or the distal end. In a further embodiment, the notch or aperture may be formed on-site (such as during installation) and, as such, the position of the notch or aperture may vary based on the chosen location of the hydraulic vent interlock.

In an embodiment, the hydraulic vent interlock may include a latch. The latch may be a spring operated latch. The spring operated latch may include two fixed members or plates, a spring positioned between the two fixed members or plates, and the plunger passing through apertures in each of the two fixed members and through the spring. The spring may be fixed to the plunger, for example, via a pin or other mechanism connecting the spring to the rod. The plunger may include a handle or curved portion and a and may correspond to the aperture or notch on the interlock bar. At rest, the spring may hold the plunger in an extended position, holding the plunger, when the interlock bar is in a lowered position, such that the plunger extends through the aperture or notch in the interlock bar. As an operator pulls the handle out and when the interlock bar is in a lowered position, the spring may compress and the plunger may recede from the aperture or notch, allowing a user or operator to lift the interlock bar.

In an embodiment, when the interlock bar is latched or engaged with the latch, the interlock bar may prevent the movement of the valve handle of the hydraulic pump assembly. When the interlock bar is not engaged with the latch, then the interlock bar may pivot about the pivot bar. Further, the hydraulic vent interlock may include a valve or plunger valve in fluid communication with the trailer's brake subsystem. When the interlock bar is in the lowered position, the valve may be depressed or actuated to an open position, while when the interlock bar is in the raised position, the valve may be raised or closed. When the valve is depressed or opened, air may flow to a controller or relay of the trailer brake subsystem causing the brakes to engage or lock. When the valve is raised or close, air may be prevented from flowing to the brake subsystem, thus causing the brakes to disengage or unlock. Thus, while a vent cover or manhole cover is open, the brakes may be locked or engaged, preventing further movement or transportation.

Further, one or more indicators may be positioned throughout the trailer or cab which the trailer is attached to. For example, the interlock bar may include one or more indicators, such as lights, LEDs, sound emitting devices, and/or other indicators. The indicators may activate when the interlock bar is in the raised position (for example, based on signals generated by a sensor or switch positioned on the interlock bar or pivot bar). Other indicators may include an indicator located in the dashboard of the cab of the truck or vehicle, an indicator positioned on a side mirror of the cab of the truck or vehicle, or at other locations within the cab of the truck or vehicle or on the trailer.

Thus, the hydraulic vent interlock described herein may prevent a user or operator from operating a transportation vehicle while a vent cover remains open, preventing unintended release of vapor and sloshing or spilling of asphalt and/or other liquid stored in the trailer. Additionally, the hydraulic vent interlock may prevent unintentional opening of the vent cover during transportation. Further, indicators disposed throughout the transportation vehicle and/or trailer, in addition to locking of the brakes of the trailer and/or vehicle, may ensure that the user or operator is aware of the vent cover being open and able to take action prior to vehicle operation.

Figure 1B:
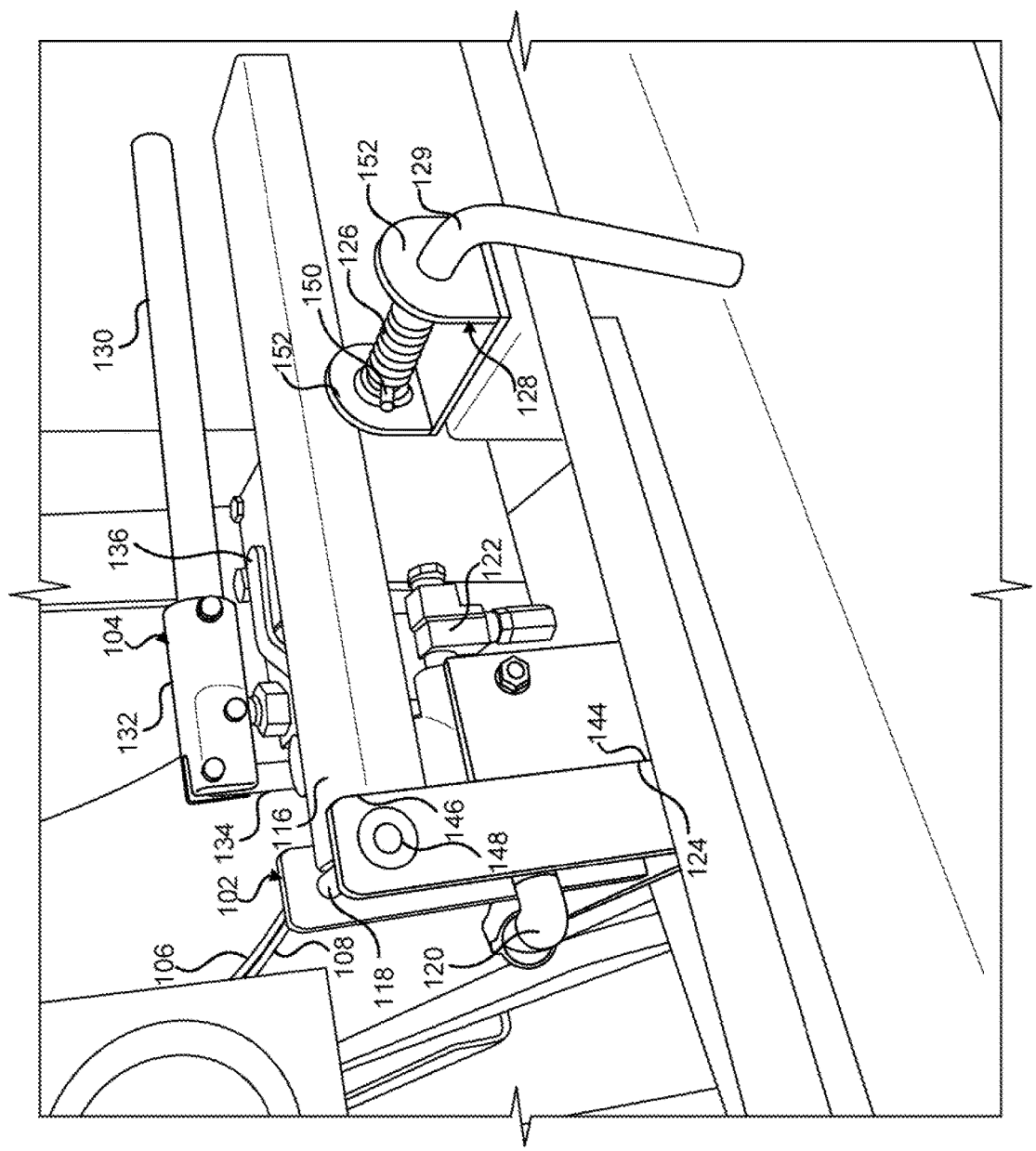

FIG. 1A, FIG. 1B, FIG. 1C, FIG. 1D, FIG. 1E, and FIG. 1F are diagrams illustrating a system 100 with a trailer 110 and a hydraulic vent interlock 102, a hydraulic vent interlock device or assembly, or a vent interlock system, according to one or more embodiments of the disclosure. Turning first to FIG. 1A and FIG. 1B, a trailer 110 may include a hydraulic vent interlock 102 and a hydraulic pump assembly 104 positioned at the rear (or, in other embodiments, other locations) or a rear portion of the trailer 110. The trailer 110 may be connected to a transportation vehicle 112 (for example, a truck, semi-truck, tractor, and/or other vehicle). The transportation vehicle 112 may control the braking subsystem of the trailer 110 and may transport the trailer 110 from one location to another. While the hydraulic vent interlock 102 and hydraulic pump assembly 104 are illustrated at the rear portion of the trailer 110, it will be understood that such an embodiment is not limiting and the hydraulic vent interlock 102 and hydraulic pump assembly 104 may be positioned along either side of the trailer 110 or at the front of the trailer 110, proximate the transportation vehicle 112. In an embodiment, the hydraulic vent interlock 102 and hydraulic pump assembly 104 may be positioned proximate hose connections or outlets, offering a convenient location proximate the hose connections or outlets (for example, potentially preventing the user or operator from failing to open the vent cover 114 or manhole cover prior to offload).

Figure 1C:
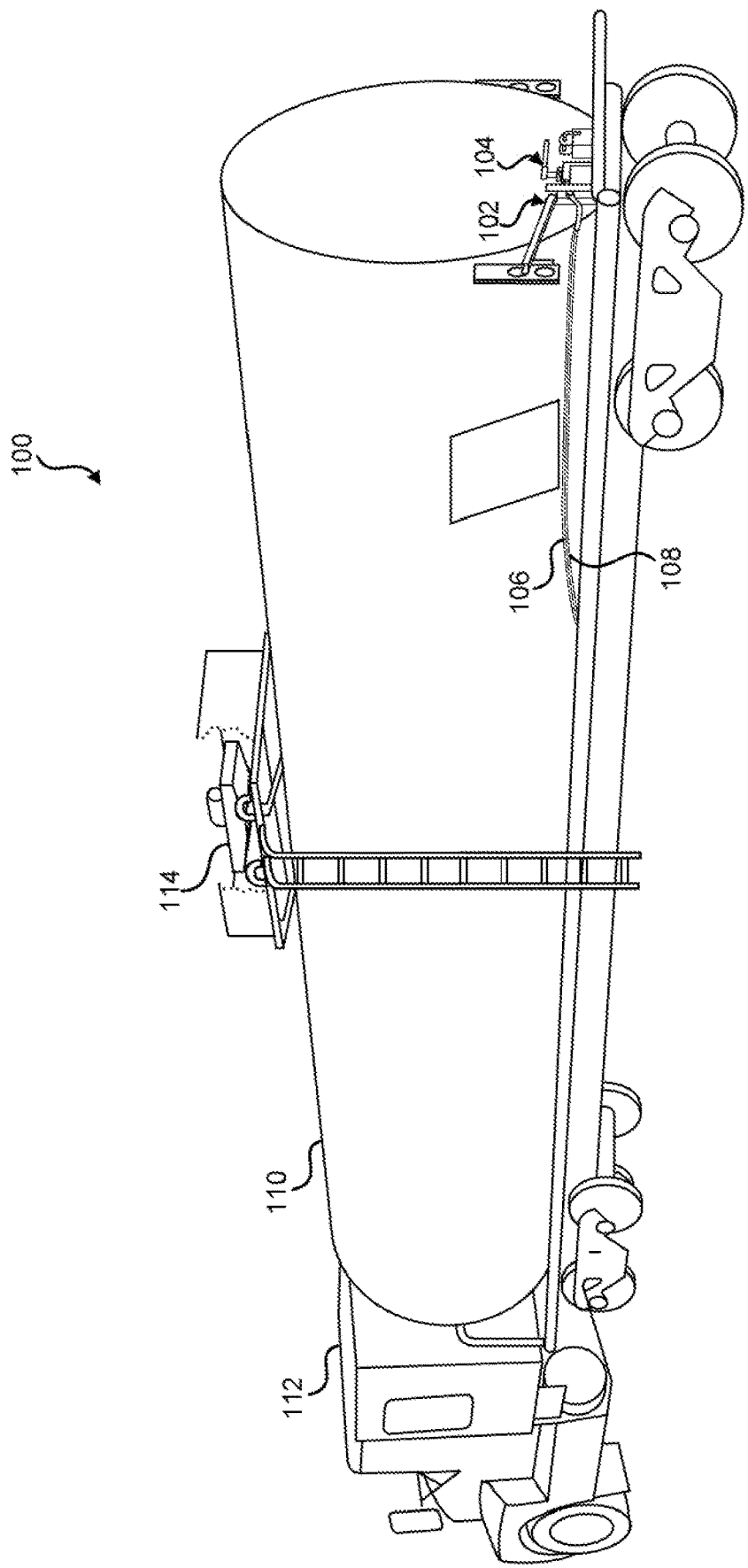
Figure 1D:
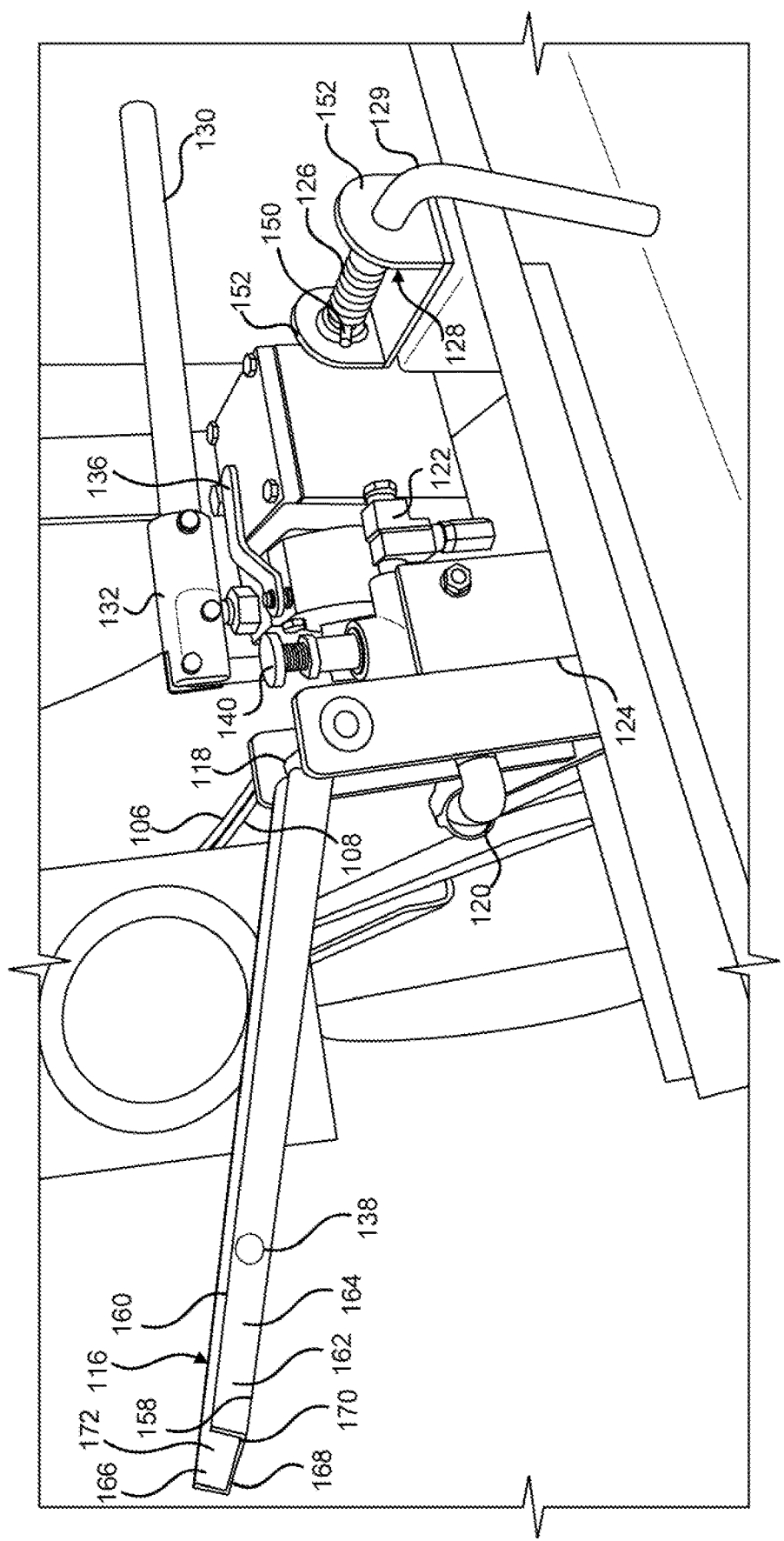
Figure 1E:
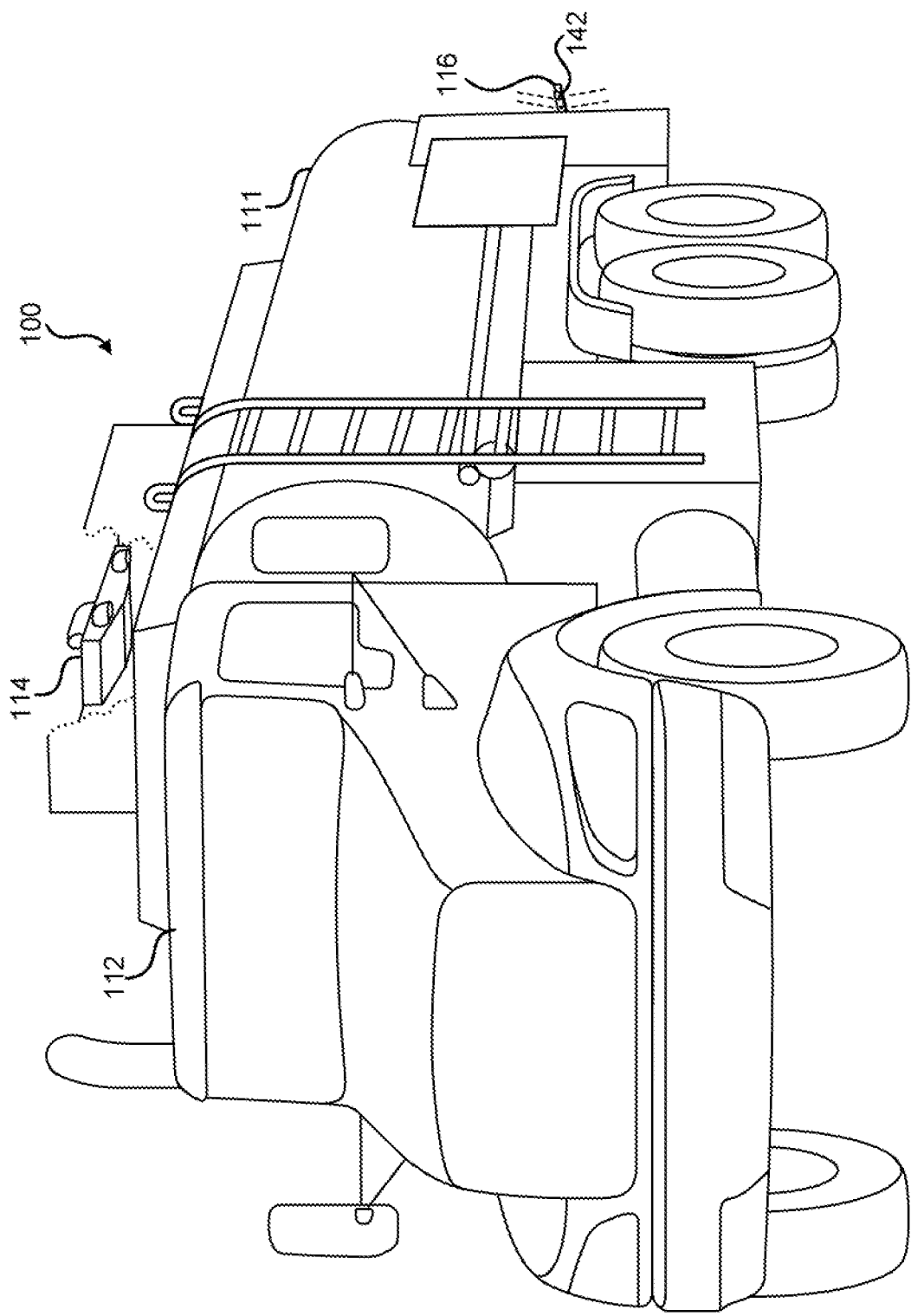

The trailer 110 may include a tank, wheels, and a brake subsystem (for example, the trailer brake subsystem). The tank may be configured to store asphalt and/or other liquids, such as hydrocarbon based liquids, contaminated water (such as, including, but not limited to, water from fracking sites and/or other well sites), drilling mud, fertilizer, molasses, syrups, other food products and/or goods, and/or other liquids stored in a non-code trailer as will be understood by one skilled in the art. While the tank illustrated is a tubular shaped tank, it will be understood that other tank types may be utilized along the hydraulic vent interlock 102 and the hydraulic pump assembly 104. In an embodiment, the trailer 110 may be separate from the transportation vehicle 112. In such embodiments, the trailer 110 may attach to the transportation vehicle 112. Such an attachment may include physical/mechanical, electrical, and/or pneumatic or hydraulic attachments. In another embodiment, rather than being separate, the trailer 110 may be integrated with the transportation vehicle 112, as illustrated in FIG. 1E. In such an embodiment, the components described herein, in relation to the hydraulic vent interlock 102 and the hydraulic pump assembly 104, may be included with and/or positioned on the transportation vehicle 112 and/or the tank 111.

The hydraulic vent interlock may include a pivot bar 124. The pivot bar 124 may be a single solid bar, a hollow bar, a u-shaped bar, a square or rectangular hollow bar, or two bars positioned parallel to one another. The pivot bar 124 may be comprised of metal, such as stainless steel or other types of metal or composites suitable for prolonged exposure to the elements. The proximal end 144 of the pivot bar 124 may be connected to a portion of the trailer 110. The pivot bar 124 may be connected to trailer 110 proximate to or nearby the hydraulic pump assembly 104. Such a connection may be a mechanical and/or removable connection. For example, the proximal end 144 of the pivot bar 124 may be welded to the trailer 110. In another example, the proximal end 144 of the pivot bar 124 may include apertures. In such an example, the trailer 110 may include corresponding apertures or an operator or installer may create corresponding apertures. The pivot bar 124 may be attached to the trailer 110 via bolts and nuts, brackets pins, rivets, and/or other fasteners applied to or inserted through the apertures of the pivot bar 124 and the corresponding apertures of the trailer 110.

The pivot bar 124 may additionally include an aperture 148 at a distal end 146 of the pivot bar 124. A pin 118 may be inserted through the aperture 148 to create a connection point for the interlock bar 116. In another embodiment, a cam, detent, or other mechanism may be utilized to connect the pivot bar 124 to the interlock bar 116. Further, the pivot bar 124 may include one or two stops. For example, the pivot bar 124 may include a first stop. The first stop may be formed from a cutout portion of the pivot bar 124. The first stop may prevent the interlock bar 116 from extending further downwards past the latch 128. The pivot bar 124 may include a second stop. The second stop may be positioned opposite the first stop. Similarly, the second stop may be formed from a cutout portion of the pivot bar 124. In another embodiment, the second stop may include another pin, cam, or detent. The second stop may prevent the interlock bar 116 from extending too far backwards and/or prevent excessive movement of the interlock bar 116 during transportation, were a user or operator to not latch or lock (for example, via latch 128) the interlock bar 116 in place after a loading or offloading operation. In yet another embodiment, the pin 118, cam, or detent may act as the first stop and/or second stop.

The hydraulic vent interlock 102 may include, as noted, an interlock bar 116. The interlock bar 116 may pivot about the pivot bar 124. The range of the pivoting action may be about 90 degrees to about 180 degrees. In an embodiment, the range of the pivoting action may be adjusted, for example, to enable additional visibility of the interlock bar 116 in the raised position and/or easier access to other components described herein. The interlock bar 116, when in a lowered position as illustrated in FIG. 1A and FIG. 1B, may prevent movement of the valve handle 136, thus the interlock bar 116 may maintain the open state of the valve of the hydraulic pump assembly 104 and/or prevent the valve handle 136 from moving. Since the valve handles 136 may remain in the open position while the interlock bar 116 is lowered, pressure may not be built in the hydraulic line connected to the vent cover, thus the vent cover may remain closed. As illustrated in FIG. 1D, the interlock bar 116 may include a notch or aperture 138 corresponding to the latch 128.

The latch 128 may include a spring 126 positioned between two fixed members 152. The two fixed members 152 may include apertures. The latch 128 may include a plunger 129 or a bar with a handle. When the spring 126 is at rest, the spring 126 may hold the plunger 129 in an extended position. Thus, if the interlock bar 116 is in the lowered position and adjacent the latch 128, then the plunger 129 may extend through the aperture 138 of the interlock bar 116 and hold the interlock bar 116 in place. When a user or operator pulls the plunger 129 back, the spring 126 may compress, causing the plunger 129 to clear or no longer extend through the aperture 138. The spring 126 may be held in place relative to the plunger 129 by a pin 150 and/or other mechanism that also passes through and/or attaches to the plunger 129. In another embodiment, other types of latches or mechanisms may be utilized to hold the interlock bar 116 in place, such as a spring hinge, a bolt latch, cam latches, magnetic latches, a toggle latch, hook and eye latches, and/or other latches as will be understood by one skilled in the art. The latch 128 may be attached to or connected to the trailer 110. Such an attachment or connection may be mechanical and/or removable. For example, the latch 128 may be welded to the trailer 110, attached to the trailer 110 via bolts, attached to the trailer 110 via brackets, and/or attached to the trailer 110 via rivets.

FIG. 1A and FIG. 1B illustrates the vent cover 114 in a closed state. Such a state may be utilized when the trailer 110 is in transit and/or the contents of the trailer 110 are not being offloaded. In such a state, as noted, no indicators may be activated and the brake subsystem may not be locked. To begin offloading product or liquid in the trailer 110, a user or operator may move the interlock bar from the lowered position (for example, as illustrated in FIG. 1A and FIG. 1B) to the raised position (for example, as illustrated in FIG. 1C, FIG. 1D, and FIG. 1E). As noted, the vent cover 114 or manhole cover may cover an aperture or opening in a tank 111 or trailer 110 and allow air to enter the tank 111 or trailer 110 and/or vapor to leave the tank 111 or trailer 110 when the vent cover is open or raised (for example, not covering the aperture or opening). When closed, the vent cover 114 or manhole cover may cover the aperture or opening and prevent fluid from spilling from the tank 111 or trailer 110.

In an embodiment, one or more indicators may be included in and/or positioned on the interlock bar 116, such as indicator 142, as illustrated in FIG. 1E. Additional indicators may be positioned throughout the system 100, such as in the dashboard, on a side mirror, and/or other locations on the transportation vehicle 112 or the trailer 110. The one or more indicators may be received power from one or more of an independent power source or a power source of the transportation vehicle 112 and/or trailer 110. The independent power source may include an energy storage device, such as a battery or capacitor based energy storage device. The one or more indicators maybe embedded in the interlock bar 116 or attached to the interlock bar 116 via, for example, adhesives, solder, and/or other mechanical fasteners. The one or more indicators may connect to a switch and/or sensor associated with the interlock bar. The switch and/or sensor may detect some aspect or character of the interlock bar 116 to determine whether the interlock bar 116 is in a raised position or lowered position. If the interlock bar 116 is in the raised position, the switch and/or sensor may cause (for example, via signal to a processor or to the power source) the power source to supply power to the one or more indicators (for example, activate the one or more indicators), thus indicating that the vent cover 114 is open and that the brakes are locked, otherwise the one or more indicators may be deactivated.

The one or more indicators may include lights and/or sound emitting devices. The lights may comprise light emitting diodes (LEDs) and/or incandescent lights. Each of the lights may be configured to use a specific or pre-selected color and lumens to ensure visibility in many conditions (such as bright, dark, day, night, rain, mist, fog, and/or other environmental conditions). Further, such a configuration may be based on a distance that the lights may be visible from, for example, 10 feet, 15 feet, 20 feet, 25 feet, 30 feet, and/or in a specified direction.

Figure 1F:
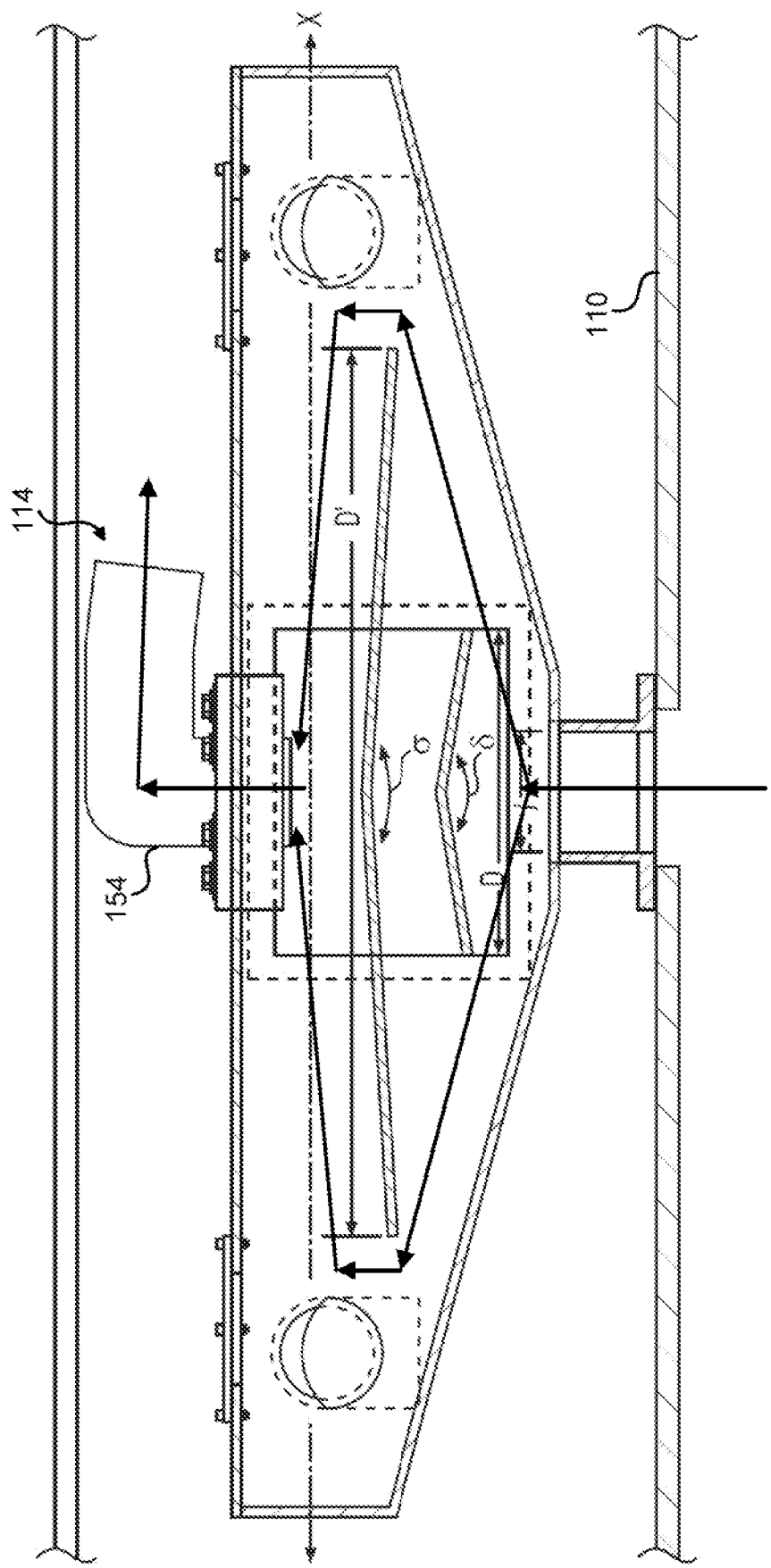

FIG. 1C, FIG. 1D, and FIG. 1E illustrate the interlock bar 116 in the raised position, thus allowing for a user or operator to actuate or move the valve handle 136 to close the corresponding valve (for example closing the pressure relief valve). The valve handle 136 may be movable from an open position to a closed position. Once the valve handle 136 has been actuated or moved (in other words, closed), a user or operator may pump the hydraulic pump handle 130. The hydraulic pump handle 130 may be connected to a piston 134 via a beam 132. Such a pumping action may cause the piston 134 to move up and down, increasing pressure within a hydraulic circuit or line connected to the hydraulic pump assembly 104 and the vent cover 114 or manhole. When the pressure reaches a threshold or selected pressure threshold, the vent cover 114 may open. Such a threshold may vary based on a number of factors. For example, the pressure to cause the vent to open may be higher if, in an example, asphalt has built up around the vent, while, in another example, the pressure to cause the vent to open may be significantly lower, as there is no build up or other material impeding the vent from opening. For example, the threshold may be about 5 PSI, about 15 PSI, about 100 PSI, about 250 PSI, or even higher. In an embodiment, the tank 111 may be considered a low pressure tank. Once the user or operator again actuates the valve handle 136 to an open position (for example, opening the pressure relief valve), then the built up pressure may be released and the vent cover 114 may close. As illustrated in FIG. 1F, when the vent is open (for example, a vent or valve housed within pipe 154), vapor may flow from the tank into the vent cover 114 or vapor box and through the pipe 154. When the vent is closed (for example, the vent or valve housed within the pipe 154), vapor may flow into the vent cover 114 or vapor box, but not through the pipe 154.

As further illustrated in FIG. 1C and FIG. 1D, the hydraulic vent interlock 102 may include a valve or plunger valve 140. The valve or plunger valve 140 may be connected to and/or in fluid communication with the trailer's brake subsystem. The valve or plunger valve 140 may signal to the trailer's brake subsystem that the vent cover 114 is open (for example, the interlock bar 116 is in a raised position, thus causing the plunger valve 140 to extend). In response to such a signal, the brake subsystem of the trailer 110 and/or the transportation vehicle 112 may provide air to cause the trailer brakes and/or the transportation vehicle brakes to disengage or lock. In other words, the brakes may be applied such that the transportation vehicle may not move or be further operated. In another embodiment, the plunger valve 140 may generate a signal (for example, pneumatic and/or electrical) and transmit the signal to the transportation vehicle 112, via gladhands, to indicate engagement of the transportation vehicle's 112 brakes and/or the trailer's 110 brakes.

In an embodiment, when the interlock bar 116 is in the raised position, the plunger valve 140 may extend and, when the interlock bar 116 is in the lowered position, the plunger valve 140 may retract or depress. In an embodiment, the plunger valve 140 may act as a stop. For example, when the interlock bar 116 is lowered the plunger valve 140 may partially depress. A user or operator may apply an amount of force to completely or substantially completely depress the plunger valve 140. As the force is applied, the interlock bar 116 and/or aperture 138 of the interlock may align with the latch 128. The latch 128 may snap or move into place (for example, with the aperture 138) automatically and/or via user interaction.

In an embodiment, the interlock bar 116 may be a u-shaped or substantially u-shaped bar (for example, as illustrated in FIG. 1D). The interlock bar 116 may include two side walls 162, 166. Each of the two side walls 162, 166 may include an inner surface (such as inner surface 172 of side wall 166), an outer surface (such as the outer surface 164 of side wall 162), an upper edge (such as the upper edge 158 of side wall 162), and a lower edge (such as lower edge 160 of side wall 162). The interlock bar 116 may include a connecting wall 168. The connecting wall 168 may include two outer edges (such as outer edge 170). Each outer edge may connect to the upper edge of one of the side walls. In another embodiment, the interlock bar 116 may comprise a single, contiguous u-shaped metal bar.

Figure 2:
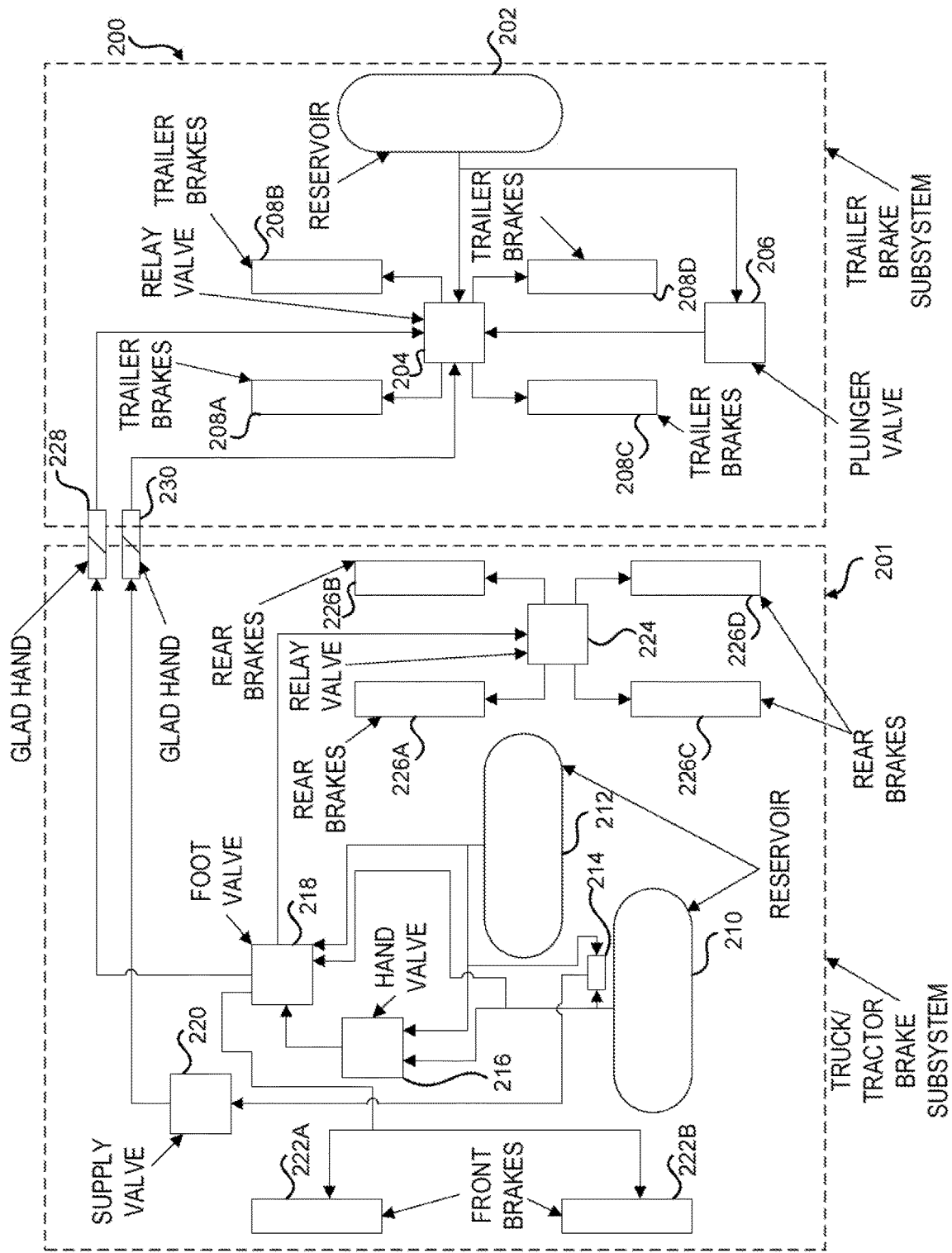
FIG. 2 is a schematic diagram illustrating integration of the hydraulic vent interlock with the brake system of a transportation vehicle and trailer, according to one or more embodiments of the disclosure.

FIG. 2 is a schematic diagram illustrating integration of the hydraulic vent interlock with the brake system of a transportation vehicle and trailer, according to one or more embodiments of the disclosure. In an embodiment, the transportation vehicle (for example, transportation vehicle 112 of FIGS. 1A through 1E) may include a vehicle brake subsystem 201 and the trailer (for example, transportation vehicle 112 of FIGS. 1A through 1E) may include a trailer brake subsystem 200. While various components are illustrated for both the vehicle brake subsystem 201 and trailer brake subsystem 200, it will be understood that additional components may be included in either subsystem (for example, electronically controlled components, spring brakes, additional reservoirs, additional relays, and/or other components).

The vehicle brake subsystem 201 may connect to the trailer brake subsystem 200 via glad hands 228, 230. Air may be supplied for various purposes through the glad hands 228, 230. For example, control signals may be sent through the glad hands 228, 230 and/or supply air may be sent through the glad hands 228, 230. In an embodiment, the plunger valve 206 may connect directly to the glad hands and/or to relay valve 204. The plunger valve 206, in such examples, may transmit signals (for example, as air and/or as an electrical signal) through the glad hands 228, 230 or directly to the vehicle brake subsystem 201.

The vehicle brake subsystem 201 may include one or more air or pneumatic reservoirs filled, for example, via a compressor located on the transportation vehicle. For example, the vehicle brake subsystem 201 may include a primary reservoir 210 and a secondary reservoir 212. Each reservoir may provide air to a number of components throughout each subsystem.

For example, as the foot valve 218 and/or the hand valve 216 is actuated or force applied thereto, air may flow through such components to various other components, such as relay valve 224, supply valve 220, and/or front brakes 222A and 222B. The relay valve 224, in response to such a signal, may then provide air to the rear brakes 2226A, 226B, 226C, and 226D, causing the rear brakes 2226A, 226B, 226C, and 226D to engage and stopping the vehicle.

In an embodiment, the trailer brakes 208A, 208B, 208C, and 208D may be controlled via the hand valve 216, the foot valve 218, and/or the plunger valve 206. For example, when the plunger valve 206 is released, then air may be applied to the trailer brakes 208A, 208B, 208C, and 208D. The air may be supplied via the glad hands 228, 230 and/or the reservoir 202. In another embodiment, the vehicle brake subsystem 201 may be controlled via the plunger valve 206. For example, when the plunger valve 206 is released (for example, thereby generating a signal, such as an amount of air or an electrical signal indicating that the plunger valve 206 is released), then air may be applied to the rear brakes 2226A, 226B, 226C, and 226D and/or front brakes 222A and 222B. In another embodiment, the plunger valve 206 may generate an electrical signal indicating whether the breaks are locked or released to a control system of the transportation vehicle. The transportation vehicle and/or the control system of the transportation vehicle may cause the vehicle brake subsystem 201 and/or the trailer brake subsystem 200 to lock the brakes preventing the transportation vehicle from operating while a vent is open.

As noted, the plunger valve 206 may, in addition to other components positioned throughout the transportation vehicle, control the brakes (for example, trailer brakes 208A, 208B, 208C, and 208D and/or the front brakes 222A and 222B and/or rear brakes 2226A, 226B, 226C, and 226D). Further, as noted, the plunger valve 206 may control the brakes pneumatically. In another example, the plunger valve 206 may control the brakes via electrical signal. In yet another example, another component, such as a switch or sensor, may control the brakes.

In other embodiments, rather than or in addition to the plunger valve 206 indicating that the brakes should lock or engage, another sensor or device may be positioned to indicate to the vehicle brake subsystem 201 and/or trailer brake subsystem 200 that the brakes should engage, as the vent cover is open. Such sensors may sense various factors, such as whether the interlock bar is covering the sensor, whether a selected amount of illumination is detected, whether a switch corresponding to the interlock bar is flipped, and/or whether power is supplied to one or more indicators positioned through the system.

Figure 3:
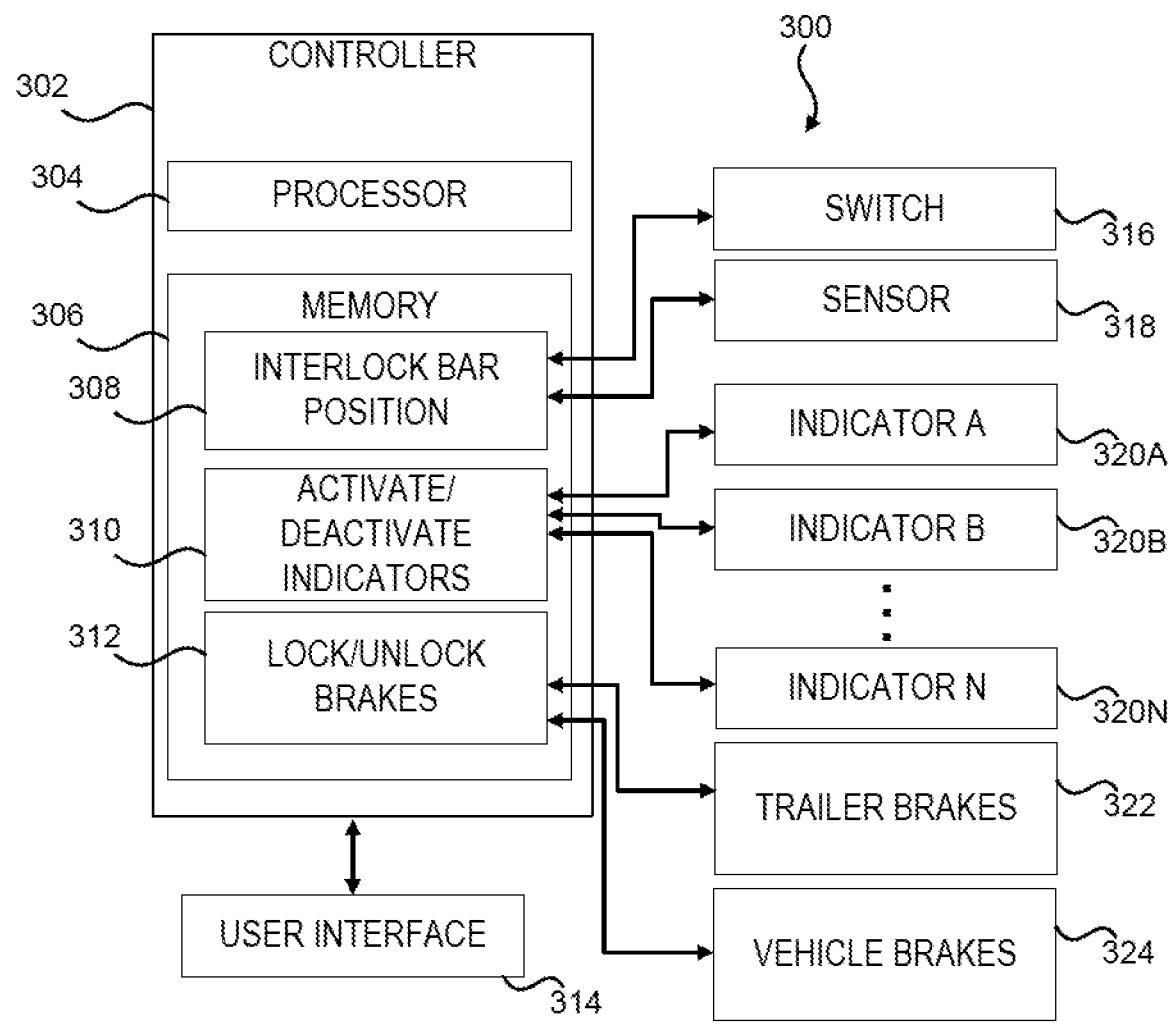
FIG. 3 is a simplified diagram illustrating a control system for the hydraulic vent interlock, according to one or more embodiments of the disclosure.

FIG. 3 is a simplified diagram illustrating a control system for the hydraulic vent interlock, according to one or more embodiments of the disclosure. A controller 302 may manage operation of the indicators and brakes, as well as other aspects, of the system 300. The controller 302 may be one or more controllers, a supervisory controller, programmable logic controller (PLC), a computing device (such as a laptop, desktop computing device, and/or a server), an edge server, a cloud based computing device, a user interface and/or computing device of the transportation vehicle, and/or other suitable devices. The controller 302 may be located at or in proximity to the hydraulic pump assembly, the hydraulic vent interlock, the glad hands connecting the transportation vehicle to the trailer, and/or in the dashboard of the transportation vehicle. The controller 302, as noted, may be more than one controller. The controller 302 may include a processor 304, or one or more processors, and memory 306. The memory 306 may include instructions. In an example, the memory 306 may be a non-transitory machine-readable storage medium. As used herein, a "non-transitory machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (for example, a hard drive), a solid state drive, any type of storage disc, and the like, or a combination thereof. As noted, the memory 306 may store or include instructions executable by the processor 304. As used herein, a "processor" may include, for example one processor or multiple processors included in a single device or distributed across multiple computing devices. The processor may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communication such as hard wiring two components together or wireless communication for remote monitoring and control/operation, as understood by those skilled in the art. For example, wireless communication may be Wi-Fi®, Bluetooth®, ZigBee, cellular wireless communication, satellite communication, or forms of near field communications. In addition, signal communication may include one or more intermediate controllers or relays disposed between elements that are in signal communication with one another.

As noted, the controller 302 may include instructions stored in the memory 306. The instructions may include instructions 308 to determine an interlock bar position. In such an embodiment, the controller 302 may receive signals indicating the position of the interlock bar from one or more of a switch 316 and/or sensor 318. For example, the interlock bar and pivot bar may each include a contact. When the interlock bar pivots up and away from the latch to a raised position, the contact of the interlock bar may touch the contact of the pivot bar. When the two contacts touch, a circuit may be formed. The circuit may include a power source and/one or more indicators. Further, an input of the controller 302 may be included in the circuit. Thus, once a positive amount of power is applied to the circuit, then the controller 302 may detect that power (for example, the power indicating that the interlock bar is in a raised position). In such examples, the absence of power may indicate that the interlock bar is in the lowered position. In another embodiment, a sensor 318 may detect some aspect or characteristic associated with the interlock bar, and, based on that detection, the controller 302 may determine the position of the interlock bar.

The instructions may include instructions 310 to activate or deactivate one or more indicators 320A, 320B, and up to 320N based on the determined position of the interlock bar. The controller 302 may send signals (for example, signals indicating a state that the indicators 320A, 320B, and up to 320N should proceed to) and/or power to the indicators 320A, 320B, and up to 320N to activate when the interlock bar is in the raised position and deactivate when the interlock bar is in the lowered position.

The instructions may include instructions 312 to lock or unlock the vehicle brakes 324 and/or trailer brakes 322, based on the determined position of the interlock bar. As described, a pneumatic signal may be generated via a plunger valve to indicate that the vehicle brakes 324 and/or trailer brakes 322 should engage or lock. In another embodiment, engagement or locking of the vehicle brakes 324 and/or trailer brakes 322 may be determined based on the determined position of the interlock bar (such a determination described above in relation to instructions 308).

Figure 4:
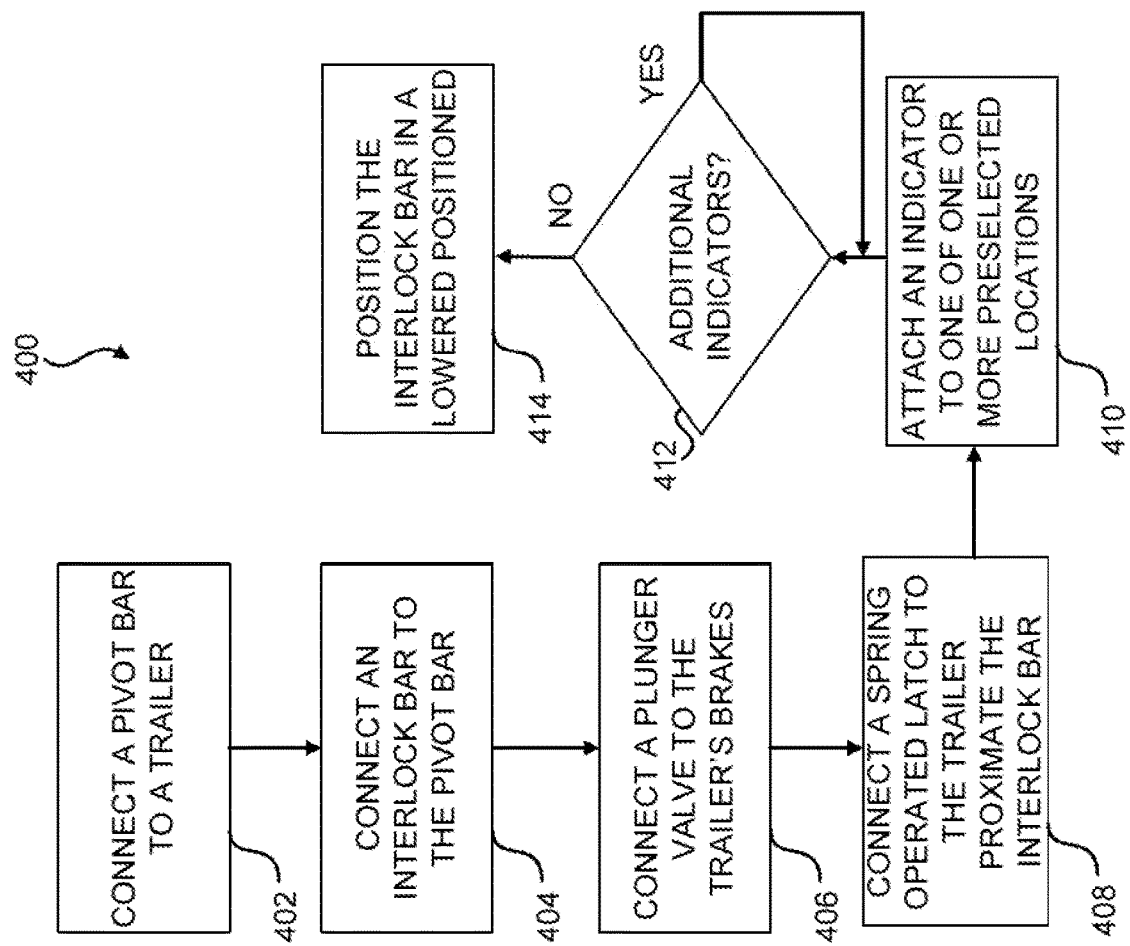
FIG. 4 is a flow diagram for installing a kit, according to one or more embodiments of the disclosure.

FIG. 4 is a flow diagram for installing a kit, according to one or more embodiments of the disclosure. The order in which the operations are described is not intended to be construed as a limitation, and any number of the described blocks may be combined in any order and/or in parallel to implement the disclosed methods.

At block 402, a user or operator may connect a pivot bar to a trailer. The user may bolt, weld, and/or fasten the pivot bar to the trailer. The user or operator may, as indicated via instructions provided in a kit, position the pivot bar a specified distance from the hydraulic pump assembly. In another embodiment, the trailer may include markers or indicators to note where the pivot bar is to be installed.

At block 404, a user or operator may connect an interlock bar to the pivot bar. In an embodiment, the pivot bar and interlock bar may be delivered in a kit. In a further embodiment, the pivot bar and interlock bar may come in the kit pre-assembled. Thus, the user or operator, in such an embodiment, may install the pivot bar and interlock bar simultaneously. In another embodiment, the pivot bar and interlock bar may come unassembled. As such, the user or operator may connect the interlock bar to the pivot bar. The interlock bar may snap onto the pivot bar. In another embodiment, the interlock bar may be fastened to the pivot bar.

At block 406, once the user or operator has connected the interlock bar to the pivot bar, then the user or operator may connect a plunger valve to the trailer and to the trailer's brake subsystem. The plunger valve may include attached pneumatic hoses or lines. The lines may terminate with male connectors. The male connectors may correspond to female connectors positioned on the relay and/or other components of the trailer's brake subsystem or, in some embodiments, the vehicle's brake subsystem. Further, the plunger valve may be positioned on the trailer such that the plunger valve is located below the interlock bar and, when the interlock bar is in a lowered position, the interlock bar depresses the plunger valve.

At block 408, a user or operator may attach a spring operated latch to the trailer. The spring operated latch may be attached to the trailer at a predetermined location at a predetermined distance from the pivot bar and interlock bar. The spring operated latch may be positioned such that, when the interlock bar is lowered, an aperture of the interlock bar aligns with a plunger of the spring operated latch.

At block 410, a user or operator may attach one of one or more indicators to one or more preselected location, such as on the interlock bar, at selected locations on the trailer, and/or at selected locations on the transportation vehicle. In another embodiment, a sensor and/or switch associated with the interlock bar and/or pivot bar may be installed and connected to the dashboard or control system of the transportation vehicle. The sensor and/or switch may be directly (for example, hardwired) or indirectly (for example, Wi-Fi, Bluetooth, RFID) connected to the dashboard and/or control system. At block 412, the user or operator may determine if another indicator is to be added (for example, additional indicators are included in the kit). If so, the user or operator may install the additional indicators, otherwise, at block 414, the user or operator may move or actuate the interlock bar to the lowered position and lock the interlock bar via the spring operated latch.

Figure 5:
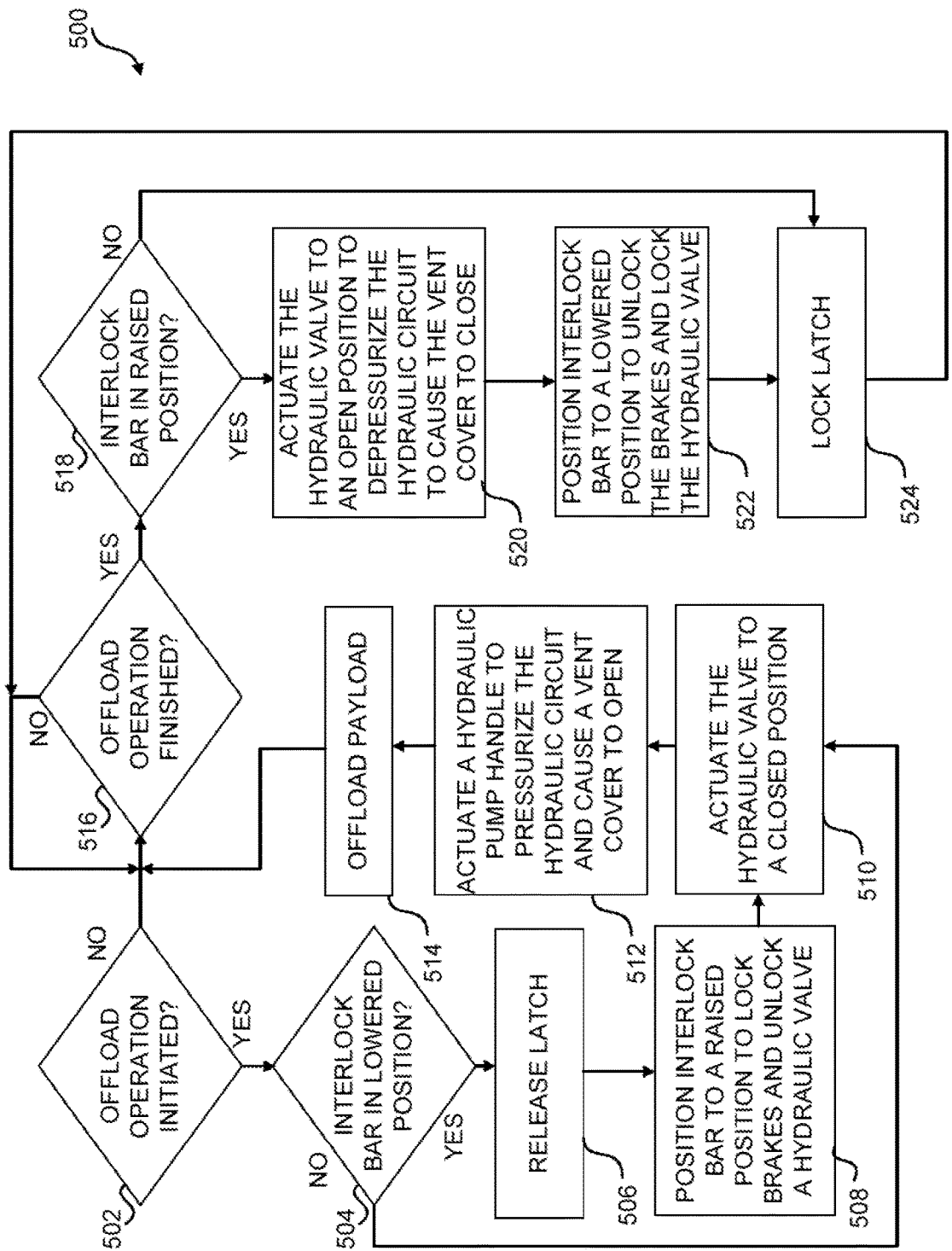
FIG. 5 is a flow diagram for utilizing the hydraulic vent interlock, according to one or more embodiments of the disclosure.

FIG. 5 is a flow diagram for utilizing the hydraulic vent interlock, according to one or more embodiments of the disclosure. The transportation vehicle, trailer, and/or associated components of FIGS. 1-5B and/or a user or operator may utilize method 500. Further, method 500 may be included in one or more programs, protocols, or instructions loaded into memory of a computing device or controller 302 or may be utilized by one or more users. The order in which the operations are described is not intended to be construed as a limitation, and any number of the described blocks may be combined in any order and/or in parallel to implement the disclosed methods.

At block 502, a user or controller 302 may determine whether an offload operation has been initiated. Such a determination may occur based on the position of an interlock bar, based on opening of a vent cover, and/or based on an input from a computing device or user interface associated with a user or operator, the input indicating that an offload operation is being initiated. If an offload operation has not been initiated, then the user or controller 302, may determine if, at block 516, whether an offload operation has finished or the user or controller 302 may determine whether an offload operation has finished.

At block 504, if the offload operation has been initiated, the user or controller may determine whether the interlock bar is in a lowered position (for example, as indicated based on a signal generated via a sensor, switch, plunger valve, and/or other device). At block 506, if the interlock bar is in the lowered position, then a user may release or disengage a latch from the interlock bar. In an embodiment, the latch may be a spring operated latch. The user may pull a plunger back, causing the spring to compress and the plunger to recede from an aperture of the interlock bar. After such an action the interlock bar may move to the raised position. At block 508, the user may raise the interlock bar to the raised position. Such an action may cause the vehicle and/or trailer brakes to lock and a valve handle to unlock (for example, the valve handle may be actuatable, as the interlock bar is no longer adjacent to the valve handle, preventing movement of the valve handle). At block 510, the user may actuate the hydraulic valve via the valve handle to a closed position. The closed position may prevent pressure release, allowing pressure to build in an associate hydraulic line. At block 512, the user may actuate the hydraulic pump assembly via the hydraulic pump handle, thus building pressure within the hydraulic line. Once a specified pressure is achieved, the vent cover or manhole may open. At block 514, the user may begin offloading the payload (for example, asphalt and/or other liquids), as ambient air may now enter the trailer preventing implosion or damage due to gas buildup within the trailer.

As noted, at block 516, the user or controller may determine whether the offload operation has finished or is ongoing. If the offload operation has finished, at block 518, the user or controller may determine whether the interlock bar is in the raised position (for example, as indicated based on a signal generated via a sensor, switch, plunger valve, and/or other device). At block 520, the user may actuate the hydraulic valve to an open position, thus releasing the pressure within the hydraulic line and causing the vent cover to close. At block 522, the user may lower the interlock bar to a lowered position, causing the plunger valve to be depressed and thereby unlock or disengage the vehicle and/or trailer's brakes. At block 524, the user may pull back the plunger of the spring operated latch until the interlock bar is aligned thereto. Once alignment is achieved, the user may release the plunger and the spring may force the plunger into the extended position, such that the plunger extends through the aperture of the interlock bar, thus locking the interlock bar, as well as the valve handle, in place.

FIG. 6A and FIG. 6B are simplified diagrams illustrating a kit including the hydraulic vent interlock, according to one or more embodiments of the disclosure. The kit may include a number of components. The kit may include a container 602. The kit may include the hydraulic vent interlock 102 (for example, as one assembled component) positioned within the container, as illustrated in FIG. 6A. As illustrated in FIG. 6B, the kit may include the unassembled components of the hydraulic vent interlock 102 positioned within the container, such as the interlock bar 612 (for example, interlock bar 116), the pivot bar 614 (for example, pivot bar 124), the latch 616 (for example, latch 128), and/or the plunger valve 618 (for example, plunger valve 140). The kit may include wiring 610 (for example, to connect the indicators 620 to a power source 622) positioned within the container 602. The kit may include pneumatic piping/connectors 608 positioned within the container 602 to connect the plunger valve to 618 to the brake system of a transportation vehicle. In another embodiment, other types of piping/connectors may be utilized in relation to the plunger valve 618, such as electrical wiring and connectors and/or hydraulic piping/connectors based on the type of brake system of the transportation vehicle. The kit may include power source 622 (for example, to power the indicators) positioned within the container 602 to power the indicators. The kit may include brackets 624 (for example, to connect the hydraulic vent interlock 102 to the trailer) positioned within the container 602 to power the indicators. The kit may include instructions, diagrams, schematics, a document including a link to a website, and/or other user documents 604 positioned within the container 602. Such documents may be in a hardcopy or paper format, and/or a digital format (for example, DVD, USB key, or other similar media).

The present application claims priority to and the benefit of U.S. Provisional Application No. 63/478,052, filed Dec. 30, 2022, titled "SYSTEMS AND METHODS FOR A HYDRAULIC VENT INTERLOCK," the disclosure of which is incorporated herein by reference in its entirety.

In the drawings and specification, several embodiments of systems and methods to activate indicators have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes may be made within the spirit and scope of the embodiments of systems and methods as described in the foregoing specification, and such modifications and changes are to be considered equivalents and part of this disclosure.

What is claimed is:

1. A vent interlock system to prevent operation of a transportation vehicle when a vent cover remains in an open position, the vent interlock system comprising:
   a hydraulic pump assembly connected to a trailer of the transportation vehicle, the hydraulic pump assembly comprising:
      a hydraulic line,
      a hydraulic valve positioned along the hydraulic line,
      a hydraulic valve handle connected to the hydraulic valve and movable between an open position, thereby to open the hydraulic valve and release pressure in the hydraulic line, and a closed position, thereby to close the hydraulic valve, and
      a pump handle to cause the vent cover positioned on the transportation vehicle to open when the hydraulic valve handle is in the closed position and when the pump handle is actuated;
   a pivot bar connected to the trailer of the transportation vehicle and proximate the hydraulic pump assembly;
   an interlock bar attached to the pivot bar and to rotate about the pivot bar to a lowered position and a raised position, so that when in the lowered position, the interlock bar prevents the hydraulic valve handle from moving from the open position to the closed position, the hydraulic valve handle to prevent the interlock bar from moving to the raised position to the lowered position when the hydraulic valve handle is in the closed position;
   a plunger valve connected to brakes of the transportation vehicle and configured to be depressed when the interlock bar is in the lowered position to unlock the brakes of the transportation vehicle and to be released when the interlock bar is in the raised position to lock the brakes of the transportation vehicle; and
   a latch attached to the transportation vehicle to hold the interlock bar in the lowered position when latched and when the interlock bar is in the lowered position.

2. The vent interlock system of claim 1, wherein the latch comprises a spring-operated latch.

3. The vent interlock system of claim 2, wherein the interlock bar comprises a u-shaped bar including:
   two side walls, each of the two side walls including:
      an inner surface,
      an outer surface,
      an upper edge, and
      a lower edge, and
   a connecting wall including two outer edges, each outer edge to connect to the upper edge of one of the two side walls.

4. The vent interlock system of claim 3, wherein one of the two side walls includes an aperture proximate the lower edge.

5. The vent interlock system of claim 4, wherein the spring-operated latch includes a bar with a handle at a distal end, and wherein the bar extends through the aperture of one of the two side walls when a spring of the spring-operated latch is at rest.

6. A vent interlock system to ensure vent cover closure prior to operation of a transportation vehicle, the vent interlock system comprising:
   an interlock device positionable to a lowered position and a raised position and configured to prevent a hydraulic valve handle of a hydraulic pump assembly of the transportation vehicle from moving from an opened position to a closed position when in the lowered position and to enable actuation of the hydraulic valve handle when in the raised position, the hydraulic valve handle to prevent the interlock device from moving from the raised position to the lowered position and to allow a vent cover of the transportation vehicle to be opened when in the closed position, and to cause the vent cover to close when in the opened position and when the vent cover is open; and
   a plunger valve connected to brakes of the transportation vehicle and configured to unlock and lock the brakes of the transportation vehicle to thereby allow or prevent operation of the transportation vehicle based on a position of the interlock device.

7. The vent interlock system of claim 6, further comprising a spring-operated latch attached to the transportation vehicle to, when latched and when the interlock device is in the lowered position, hold the interlock device in the lowered position via a notch or aperture in the interlock device.

8. The vent interlock system of claim 6, wherein the interlock device in the lowered position causes the plunger valve to depress, wherein the plunger valve is configured to unlock the brakes of the transportation vehicle when depressed, and wherein the plunger valve connects to one or more of a transportation vehicle braking subsystem or a trailer braking subsystem.

9. The vent interlock system of claim 8, wherein connection between the plunger valve and the one or more of (a) the transportation vehicle braking subsystem or (b) the trailer braking subsystem comprises one or more of an electrical connection, a hydraulic connection, or a pneumatic connection.

10. The vent interlock system of claim 6, wherein the plunger valve is configured to generate a signal (a) corresponding to a type of connection between the plunger valve and the brakes of the transportation vehicle and (b) to indicate locking or unlocking of the brakes.

11. The vent interlock system of claim 6, wherein the interlock device in the raised position causes the plunger valve to release, and wherein the plunger valve is configured to lock the brakes of the transportation vehicle when released.

12. The vent interlock system of claim 6, wherein the interlock device includes one or more indicators.

13. The vent interlock system of claim 12, wherein the interlock device in the raised position causes the one or more indicators to activate, and wherein the one or more indicators are visible from a cabin of the transportation vehicle when the interlock device is in the raised position.

14. A kit to provide an interlock bar to prevent operation of a transportation vehicle while a vent cover remains open, the kit comprising:
a container;
the interlock bar positioned in the container;
a pivot bar positioned in the container and configured to connect to the interlock bar and allow rotation of the interlock bar between a lowered position and a raised position;
a plunger valve positioned in the container and configured to connect to brakes of the transportation vehicle and proximate to the interlock bar, the interlock bar, when in the raised position to release the plunger valve and lock brakes of the transportation vehicle, thereby to prevent operation of the transportation vehicle; and
a spring-operated latch positioned in the container, to attach to a trailer of the transportation vehicle and proximate to the interlock bar, and configured to hold the interlock bar in the lowered position via a notch or aperture.

15. The kit of claim 14, further comprising:
one or more indicators positioned in the container and configured to signal when the interlock bar is in the raised position and the vent cover is open.

16. The kit of claim 15, further comprising:
one or more wire assemblies positioned in the container, each of the one or more wire assemblies configured to connect to each of the one or more indicators, the one or more wire assemblies also configured to connect to a switch positioned on the interlock bar, the interlock bar when in the raised position configured to actuate the switch to thereby provide power to the one or more indicators through the one or more wire assemblies.

17. The kit of claim 16, further comprising a diagram positioned in the container to specify one or more connections between the one or more wire assemblies to the switch.

18. The kit of claim 16, wherein the one or more indicators configured to connect to one or more of (a) the trailer of the transportation vehicle, (b) the interlock bar, or (c) a cabin of the transportation vehicle.

19. The kit of claim 14, further comprising a plurality of brackets positioned in the container, wherein the plurality of brackets attach to each of (a) the pivot bar and (b) the interlock bar and configured to fasten the pivot bar to the trailer of the transportation vehicle and connect the interlock bar to the pivot bar.

20. The kit of claim 14, further comprising one or more indicators positioned in the container, the one or more indicators configured to connect to the interlock bar and a power source, the one or more indicators to receive power from the power source when the interlock bar is in the raised position, thereby to indicate that the vent cover is open.

21. A method to prevent operation of a transportation vehicle while a vent cover remains open, the method comprising:
connecting a pivot bar to a trailer of the transportation vehicle;
connecting an interlock bar to a fixed point on the pivot bar, the interlock bar to rotate about the pivot bar to a lowered position and a raised position;
connecting a plunger valve to transportation vehicle brakes, the plunger valve configured to be depressed when the interlock bar is in the lowered position to thereby unlock the transportation vehicle brakes of the transportation vehicle and to be released when the interlock bar is in the raised position to thereby lock the transportation vehicle brakes of the transportation vehicle; and
attaching a spring-operated latch to the trailer of the transportation vehicle, the spring-operated latch configured to prevent or allow rotation of the interlock bar, the spring-operated latch positioned to hold the interlock bar in the lowered position.

22. The method of claim 21, further comprising positioning one or more indicators on one or more of: (a) the interlock bar, (b) one or more sides of the transportation vehicle, or (c) in a cabin of the transportation vehicle.

23. The method of claim 22, further comprising connecting the one or more indicators to a first end of one or more wire assemblies, a second end of one or more wire assemblies connected to a power source or a battery, thereby to provide power to the one or more indicators when the interlock bar is in the raised position.

24. The method of claim 23, wherein the one or more indicators include one or more visual indicators.

25. The method of claim 22, wherein the spring-operated latch is connected to the interlock bar via a notch or aperture in the interlock bar.

26. The method of claim 22, wherein the spring-operated latch is attached to the trailer of the transportation vehicle via one or more fasteners or mechanical connections.

27. The method of claim 22, further comprising:
mounting the one or more indicators to one or more of (a) the transportation vehicle or (b) the trailer of the transportation vehicle;
attaching a first end of one of one or more wire assemblies to each of one or more indicators;
passing each of the one or more wire assemblies through the trailer of the transportation vehicle to the cabin of the transportation vehicle; and
connecting a second end of one of the one or more wire assemblies to a switch positioned proximate the interlock bar, the switch to create a circuit, when the interlock bar is in the raised position, between a power source and one or more indicators to thereby activate the one or more indicators.

28. The method of claim 27, wherein the one or more indicators are positioned at one or more of (a) the trailer of the transportation vehicle and proximate to the interlock bar or (b) in the cabin of the transportation vehicle.

29. The method of claim 27, wherein the power source comprises a battery positioned in one or more of the trailer of the transportation vehicle or the cabin of the transportation vehicle.

30. The method of claim 27, wherein the one or more indicators comprise one or more lights.

* * * * *